(12) United States Patent
Vaughn

(10) Patent No.: US 10,709,975 B2
(45) Date of Patent: Jul. 14, 2020

(54) SYSTEMS AND METHODS FOR MANIPULATING A VIRTUAL OBJECT

(71) Applicant: Intel Corporation, Santa Clara, CA (US)

(72) Inventor: Robert Lawson Vaughn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 836 days.

(21) Appl. No.: 15/197,461

(22) Filed: Jun. 29, 2016

(65) Prior Publication Data

US 2018/0001192 A1 Jan. 4, 2018

(51) Int. Cl.
| | |
|---|---|
| *A63F 13/285* | (2014.01) |
| *A63F 13/327* | (2014.01) |
| *A63F 13/211* | (2014.01) |
| *A63F 13/812* | (2014.01) |
| *A63F 13/212* | (2014.01) |

(52) U.S. Cl.
CPC .......... *A63F 13/285* (2014.09); *A63F 13/212* (2014.09); *A63F 13/211* (2014.09); *A63F 13/327* (2014.09); *A63F 13/812* (2014.09); *A63F 2300/8011* (2013.01); *A63F 2300/8082* (2013.01)

(58) Field of Classification Search
CPC .... A63F 13/211; A63F 13/285; A63F 13/327; A63F 13/812; A63F 2300/8011; A63F 2300/8082
See application file for complete search history.

(56) References Cited

U.S. PATENT DOCUMENTS

| | | | | |
|---|---|---|---|---|
| 2006/0154726 A1* | 7/2006 | Weston | ................... | A63H 30/04 463/37 |
| 2008/0312010 A1* | 12/2008 | Marty | ................ | A63B 24/0003 473/447 |
| 2010/0302015 A1* | 12/2010 | Kipman | ................... | G06F 3/011 340/407.1 |
| 2012/0253489 A1* | 10/2012 | Dugan | ............... | A63B 71/0622 700/91 |

(Continued)

OTHER PUBLICATIONS

Kammoun, Slim, et al., "Guiding Blind People with Haptic Feeback", Frontiers in Accessibility for Pervasive Computing, (2012), 3 pages.

*Primary Examiner* — Afroza Chowdhury
(74) *Attorney, Agent, or Firm* — Schwegman Lundberg & Woessner, P.A.

(57) ABSTRACT

Various examples are directed to a haptic device for manipulating a virtual projectile. The haptic device may receive a trajectory of the virtual projectile. A position circuit may determine a first position of a body part of a user based at least in part on a motion signal received from a motion sensor. A comparator circuit may determine a first distance between the first position of the body part and the trajectory. A feedback circuit may excite a haptic actuator of the haptic device at a first level. The position circuit may also determine a second position of the body part. The comparator circuit may also determine a second distance between the second position of the body part and the trajectory. The second distance may be different than the first distance. The feedback circuit may excite the haptic actuator at a second level different than the first level.

23 Claims, 17 Drawing Sheets

(56) References Cited

U.S. PATENT DOCUMENTS

| | | | |
|---|---|---|---|
| 2013/0128022 A1* | 5/2013 | Bose | H04N 7/18 348/77 |
| 2013/0296048 A1* | 11/2013 | Jeffery | A63F 13/12 463/31 |
| 2014/0180451 A1* | 6/2014 | Marty | G09B 19/0038 700/91 |
| 2014/0235348 A1* | 8/2014 | Liang | A63B 60/46 463/36 |
| 2016/0054837 A1* | 2/2016 | Stafford | G06F 3/012 463/33 |
| 2016/0187974 A1* | 6/2016 | Mallinson | G06F 3/014 463/32 |

* cited by examiner

SYSTEMS AND METHODS FOR MANIPULATING A VIRTUAL OBJECT

TECHNICAL FIELD

Examples described herein generally relate to systems and methods for manipulating virtual objects, such as virtual projectiles.

BACKGROUND

In gaming, simulations, and other technologies, it is desirable to manipulate virtual objects, such as virtual projectiles.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which.

DETAILED DESCRIPTION

In the following description, for purposes of explanation, numerous specific details are set forth in order to provide a thorough understanding of some examples. It will be evident, however, to one skilled in the art that the present disclosure may be practiced without these specific details.

Figure 1:
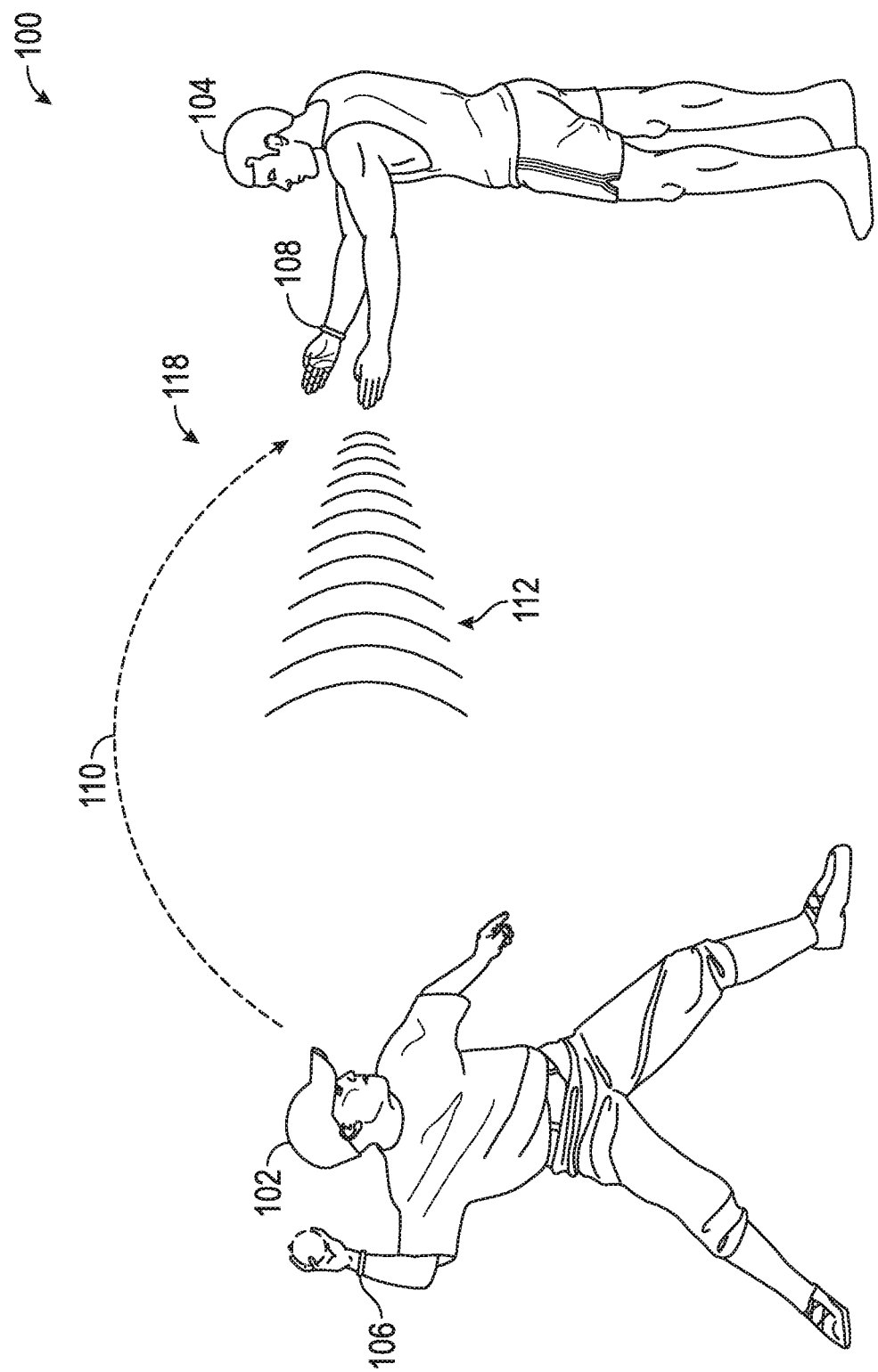
FIG. 1 is a diagram showing one example of an environment including two users playing catch with a virtual projectile.

Various examples described herein are directed to systems and methods for manipulating virtual objects. In some examples, systems and methods may be directed to conducting a virtual game of catch with a virtual projectile. FIG. 1 is a diagram showing one example of an environment 100 including two users 102, 104 playing catch with a virtual projectile. The users 102, 104 utilize haptic devices 106, 108. Haptic devices 106, 108 each include one or more haptic actuators configured to provide sensations to the respective users 102, 104. In the example of FIG. 1, the haptic devices 106, 108 include wrist bands configured to be worn around the respective wrists of the users 102, 104. In addition to or instead of a wrist band, in some examples, the haptic devices 106, 108 may include gloves wearable on the user's hand, an ankle band wearable around the user's ankle, or any component wearable on any body part of the user. In other examples, the haptic devices 106, 108 may comprise a wand or other object held in the users' hands. Haptic devices 106, 108 may also include one or more motion sensors for sensing a motion of the haptic devices 106, 108. The motion of the haptic device may mimic the motion of the users' respective body parts that wear and/or hold the haptic devices 106, 108.

In a virtual game of catch, the first user 102 makes a propelling motion with the body part of the first user 102 that is either holding or wearing the haptic device 106 (in FIG. 1, a hand or arm). The propelling motion may be, for example a throwing motion with the arm or arms of the user 102, a kicking motion with a foot of the user 102, etc. The haptic device 106 generates a motion signal indicating the motion of the user's body part and determines that the motion is a propelling motion. In some examples, the haptic device 106 excites a haptic actuator during the propelling motion to recreate the sensation of kicking or throwing the virtual projectile. For example, the haptic device 106 may excite a haptic actuator while the virtual projectile would be in contact with the hand, foot, or other body part of the user 102 making the propelling motion. The haptic device 106 may determine a trajectory 110 of a virtual projectile based on the propelling motion. For example, if the user 102 makes a throwing or kicking motion, the trajectory 110 of the virtual projectile may describe a path that a ball or other real projectile would take if propelled (e.g., thrown or kicked) according to the propelling motion.

A second user 104 may participate in the virtual game of catch with the second haptic device 108. Like the first haptic device 106, the second haptic device 108 may be held by or worn on a body part of the second user, such as a hand, wrist, foot, etc. In the example of FIG. 1, the haptic device 108 includes a wrist band worn on a wrist of the user 104. The haptic device 108 may receive trajectory data directly or indirectly from the haptic device 106. The trajectory data may describe the trajectory 110 of the virtual projectile. FIG. 1 shows a wireless communication medium 112 by which the haptic device 108 may receive the trajectory data. The wireless communication medium 112 may include or utilize any suitable protocol including, for example, Wi-Fi, Bluetooth®, Near Field Communication (NFC), or any other suitable medium.

The haptic device 108 may determine an end 118 of the trajectory 110 (e.g., a location where the virtual projectile would land if it were a physical object). The haptic device 108 may also track a location of the second user's body part (e.g., hand, foot, etc.), for example, based on one or motion signals received from one or more motion sensors. The haptic device 108 may excite a haptic actuator at a level based at least in part on the distance between the second user's body part and the end 118 of the trajectory 110. For example, an intensity (e.g., amplitude or frequency) at which the haptic actuator is excited may increase as the second user's body part comes closer to the end 118 of the trajectory 110. The haptic device 108 may determine that the user 104 receives the virtual projectile (e.g., catches the virtual projectile, traps the virtual projectile, etc.) when the body part of the user 104 (e.g., as sensed by the motion sensor) is at the end 118 of the trajectory 110 at the time when the virtual projectile would have arrived. The haptic device 108 may determine that the user 104 "drops" the virtual projectile if the body part of the user 104 is not at the end 118 of the trajectory 110 when the virtual projectile would have arrived. In some examples, the user 104 may propel the virtual projectile back to the user 102, who may receive the virtual projectile, for example, by reversing the process described above.

Figure 2:
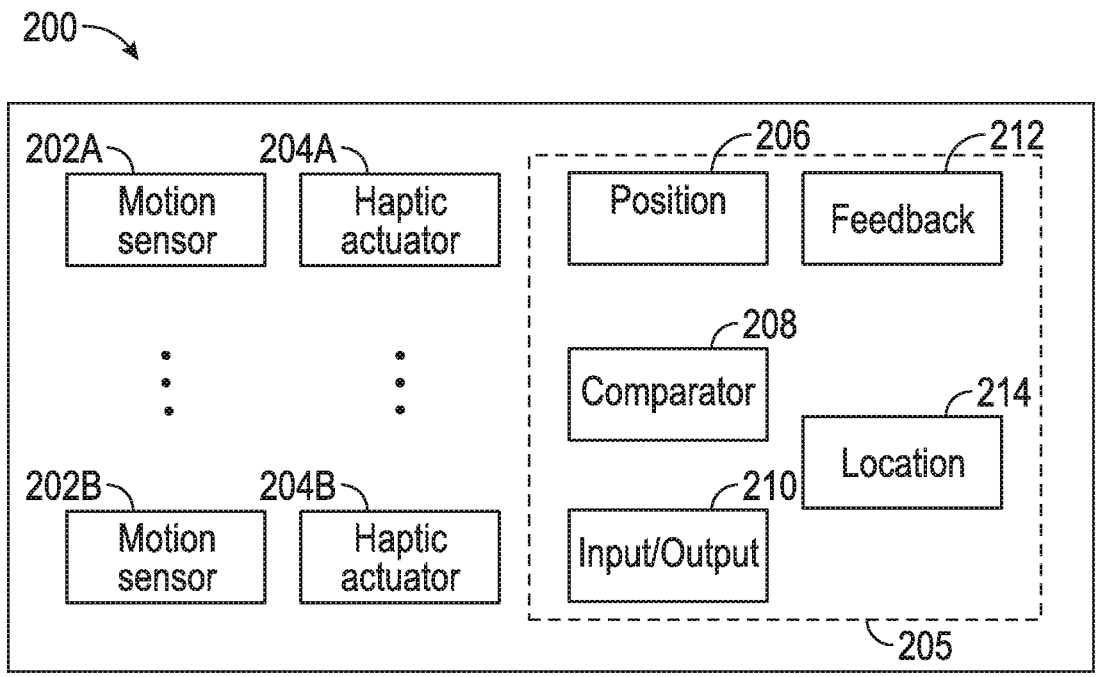
FIG. 2 is a diagram showing an example architecture of a haptic device for manipulating virtual objects.

FIG. 2 is a diagram showing an example architecture of a haptic device 200 for manipulating virtual objects. The haptic device 200 may be and/or be similar to any of the haptic devices described herein. The haptic device 200 may comprise one or more motion sensors 202A, 202B for generating motion signals describing motion of the haptic device 200. Any suitable type of motion sensor may be included such as, for example, gyroscopic sensors, accelerometers, etc. Although two motion sensors 202A, 202B are shown in FIG. 2, any suitable number or type of motion sensor may be included.

The haptic device 200 may also include one or more haptic actuators 204A, 204B. Again, although two haptic actuators 204A, 204B are shown in FIG. 2, any suitable number of haptic actuators 204A, 204B may be included. Haptic actuators 204A, 204B may include any suitable device capable of generating a sensation to the user wearing and/or holding the haptic device 200. Example types of haptic actuators include eccentric rotating mass (ECMs) actuators, linear resonant actuators (LRAs), and piezo actuators.

An ECM may include an electric motor that rotates a shaft (e.g., a rotating motor). A mass is coupled to the shaft in an eccentric or offset manner such that when the motor shaft rotates, the ECM vibrates. An ECM is excited by providing an electric drive signal to drive the motor. The level or intensity of the vibration may be determined by the rotational speed of the motor, which, in turn, may be determined by the properties (e.g., current, voltage, frequency, etc.) of the drive signal.

An LRA may include a coil and magnet. The LRA may be excited by providing a drive signal to energize the coil. When energized, the coil may exert a magnetic force that attracts the magnet. Relative movement of the magnet, the coil, and/or components coupled to the coil or magnet may cause vibration of the LRA. The level of excitement may be determined by an intensity (e.g., current or voltage) of the drive signal and/or a frequency of the drive signal. The intensity of the drive signal may determine an amplitude of the LRA (e.g., the distance traversed by magnet, coil, or coupled component). The frequency of the drive signal may determine the frequency of the LRA.

A piezo actuator may comprise a piezo material that changes its shape in response to a drive signal. The piezo actuator may be excited by providing a drive signal that changes the shape of a piezo material in the piezo actuator. A level of the excitement may be determined by the intensity (e.g., current or voltage) of the drive signal and/or by the frequency of the drive signal. For example, the intensity of the drive signal may determine the amount of shape change experienced by the piezo material. The frequency of the drive signal may determine a vibration frequency of the piezo actuator.

The haptic device 200 may also comprise a control circuit 205. The control circuit 205 may comprise various circuits for controlling the haptic device 200 and utilizing the haptic device to manipulate virtual objects, such as the virtual projectiles described herein. The control circuit 205 and various sub-control circuits 206, 208, 210, 212, 214 may be implemented in any suitable combination of hardware and/or software, for example, as described herein.

A location circuit 214 may generate a location signal indicative of a location of the haptic device 200. The location circuit 214 may include any suitable hardware or software for finding a location of the haptic device 200. In some examples, the location circuit 214 comprises a Global Positioning System (GPS) transceiver for determining the location of the haptic device 200 via communication with one or more GPS satellites. Other location techniques and/or hardware may be used in addition to or instead of GPS, such as, for example, triangulation utilizing a cellular and/or Wi-Fi signal, etc. In some examples, the location circuit 214 may utilize a GPS or other location techniques with a resolution of about one centimeter or less.

A position circuit 206 may be configured to determine a position of a body part of a user of the haptic device 200. The body part may be the body part with which the user either holds or wears all or a portion of the haptic device 200 (e.g., a wrist, a hand, an ankle, a foot, etc.). For example, the position circuit 206 may receive the location signal from the location circuit. The position circuit 206 may also receive one or more motion signals from the motion sensors 202A, 202B, etc. The position circuit 206 may determine the position of the haptic device 200 by deriving motion of the haptic device 200 from the motion signal and adding the motion to location indicated by the location signal. In some examples, motion sensors 202A, 202B may be omitted and the position circuit 206 may determine motion of the haptic device 200 based on the location signal over time. The position of the body part may be the same as the position of haptic device 200 or different. In some examples, the position of the body part may be offset from the position of the haptic device 200 by a fixed distance. For example, if the haptic device 200 is worn around the user's wrist, the body part may be a hand. To find the position of the hand, the haptic device 200 may determine the position of the haptic device and then add an offset in the direction of the hand.

In some examples, the position circuit 206 may also be configured to detect that motion of the body part is a propelling motion (e.g., throwing, kicking, etc.). For example, the position circuit 206 may be configured to compare a motion of the body part to template body part motions indicating a propelling motion. From the propelling motion, the position circuit 206, in some examples, is also configured to calculate the trajectory of the virtual projectile A comparator circuit 208 may be configured to compare the position of the body part (e.g., the position of the haptic device 200) to the end of the trajectory of the virtual projectile. For example, the comparator circuit 208 may determine whether the body part is in a proper position to receive the virtual projectile (e.g., whether the body part is within a threshold distance of the end of the trajectory). The comparator circuit 208 may also determine whether the virtual projectile has reached the end of its trajectory and may determine whether the body part is in a proper position to receive the virtual projectile when it arrives.

An input/output (I/O) circuit 210 may be configured to send and receive data from the haptic device 200. The I/O circuit 210 may include any suitable hardware and/or software for communicating data to or from the haptic device 200. In some examples, the I/O circuit 210 includes a wireless transceiver configured to operate, for example, according to the Wi-Fi protocol, or a short range wireless protocol such as, for example, Bluetooth®. In some examples, the I/O circuit 210 includes a transceiver for transmitting and receive data by electromagnetic induction, for example, according to NFC or another suitable protocol. Also, in some examples, the I/O circuit 210 includes an infrared transmitter and/or receiver, for example, for receiving and/or transmitting data according to any suitable infrared protocol. In some examples, the I/O circuit 210 includes a wired connection, such as a Universal Serial Bus (USB) or any other suitable wired connection.

A feedback circuit 212 may be configured to excite the haptic actuators 204A, 204B. For example, the feedback circuit 212 may receive a signal from the position circuit 206 indicating that a propelling motion has been detected. The feedback circuit 212 may excite one or more of the haptic actuators 204A, 204B in response, for example, until the propelling motion is complete. Also, in some examples, the feedback circuit 212 may receive a signal from the comparator circuit 208 indicating the relative position of the body part in relation to the end of the trajectory. The feedback circuit 212 may excite one or more of the haptic actuators 204A, 204B at a level corresponding to the distance between the body part and the end of the trajectory.

Figure 3:
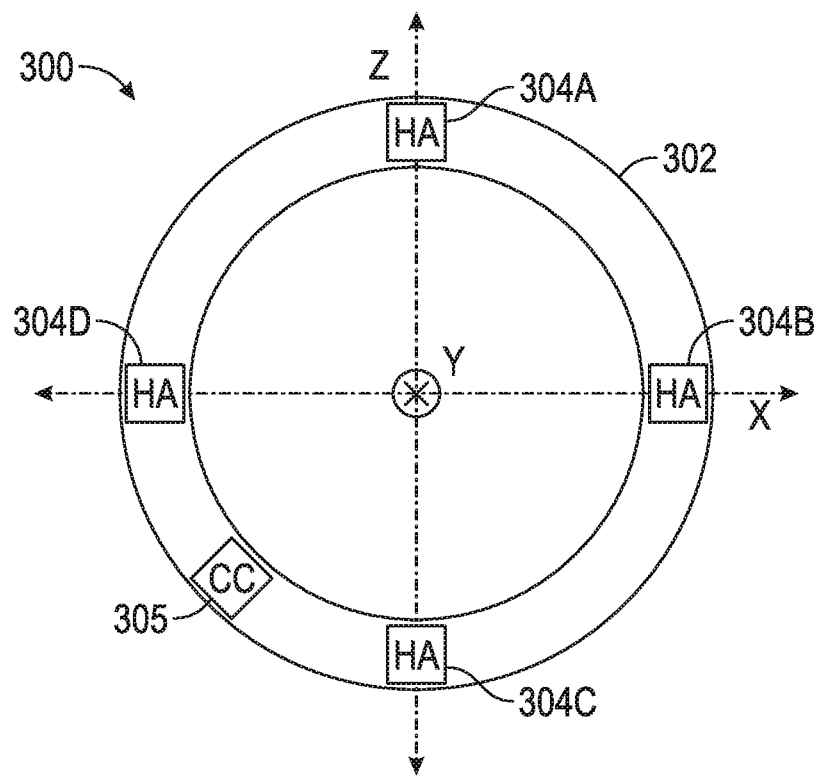
FIG. 3 is a diagram showing an example of a haptic device.

FIG. 3 is a diagram showing an example of a haptic device 300. The haptic device 300 comprises a body 302. The body 302 may be configured for fastening around a body part (wrist, ankle, etc.) of the user wearing the haptic device 300. The haptic device 300 includes a control circuit 305, which may be similar to the control circuit 205 described above. (The haptic device 300 may also include one or more motion detectors, which may be included separately and/or included with the control circuit 305). The haptic device 300 also includes haptic actuators 304A, 304B, 304C, 304D.

In FIG. 3, the haptic device 300 is shown in a reference position relative to a Cartesian coordinate system include an x-axis, a y-axis, and a z-axis. When in use, the haptic device 300 may take various different positions relative to the x, y, and z axes, for example, as the user moves the body part or parts that hold or wear the haptic device 300. Also, although the positions of various components are described herein with respect to a Cartesian coordinate system, any suitable coordinate system may be used.

Figure 4:
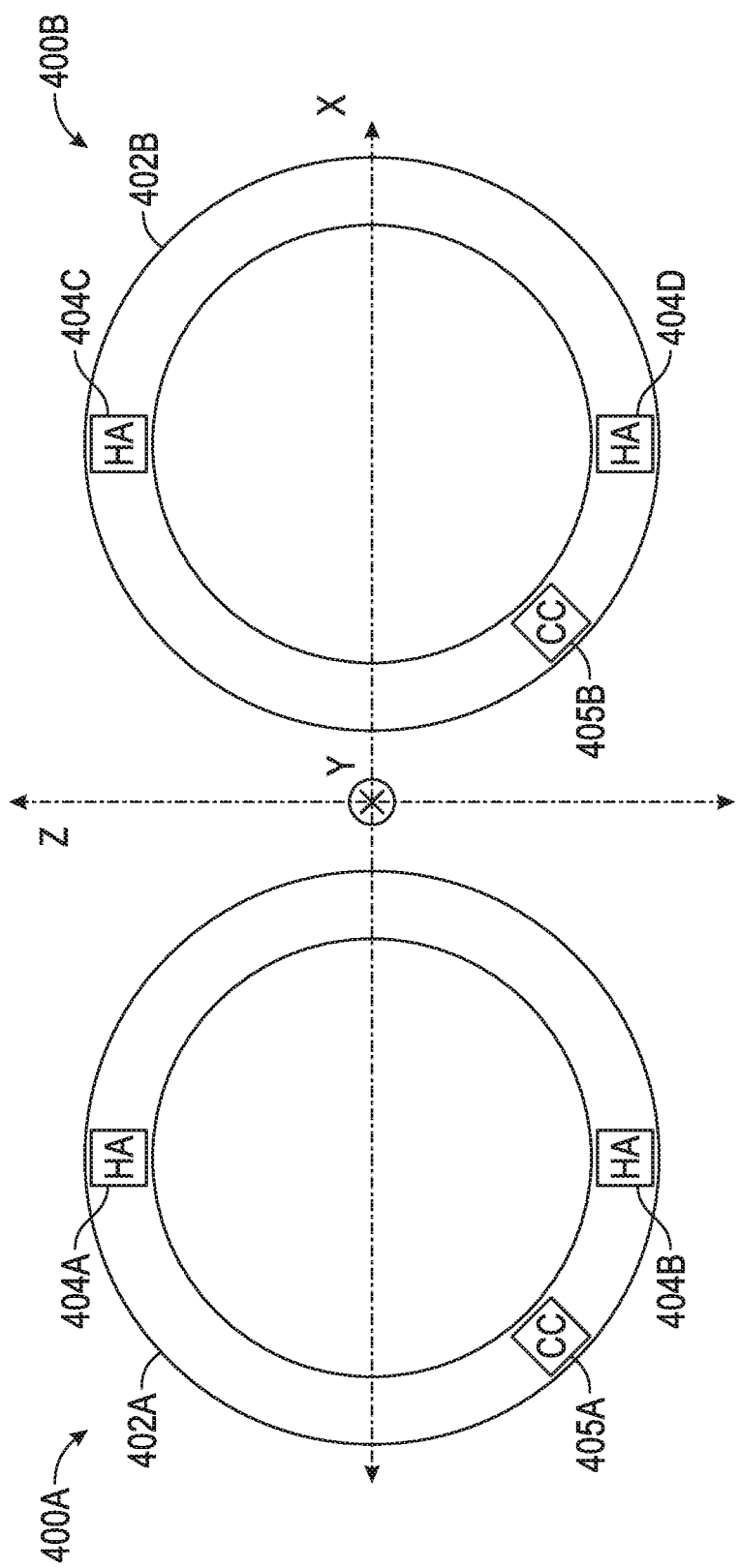
FIG. 4 is a diagram showing an example of two haptic devices suitable for pairing.

The example haptic device 300 of FIG. 3, haptic actuators 304A, 304B, 304C, 304D are positioned on the xz plane offset from one another by about 90°. In some examples, and as described in more detail herein, haptic actuators 304A, 304B, 304C, 304D may be selectively excited to indicate the direction that the user should move to receive the virtual projectile. For example, the control circuit 305 may determine an orientation of the haptic device 300 in the three-dimensional space described by the x, y, and z axes and select the appropriate axis FIG. 4 is a diagram showing an example of two haptic devices 400A, 400B suitable for pairing. Haptic device 400A includes a control circuit 405A and haptic actuators 404A, 404B. Like the haptic device 300, the haptic device 400A may also include one or more motion sensors. Haptic device 400B also includes a control circuit 405B and haptic actuators 404C, 404D. Haptic device 400B may also include one or more motion sensors. Bodies 402A, 402B of the respective haptic devices 400A, 400B may be configured for fastening around body parts of the user (e.g., wrists, ankles, etc.). For example, the user may wear haptic device 400A on a left wrist or ankle and haptic device 404B on a right wrist or ankle.

In some examples, when the haptic devices 400A, 400B are worn by the same user, the haptic devices 400A, 400B may pair. Pairing may occur when the respective control circuits 405A, 405B communicate with one another and coordinate to send and/or receive a virtual projectile. Control circuits 405A, 405B may include I/O circuits similar to the I/O circuit 210 of FIG. 2. The respective I/O circuits may include components for placing the haptic devices 400A, 400B in communication with one another such as, for example, transceivers for Wi-Fi or Bluetooth®, inductive transceivers for NFC or a similar protocol, infrared transceivers, etc. The control circuits 405A, 405B may be configured to pair the haptic devices 400A, 400B.

When the haptic devices 400A, 400B are paired, control circuits 405A, 405B may selectively excite the haptic actuators 404A, 404B, 404C, 404D based on their respective positions to indicate the direction that the user should move to receive the virtual projectile. For example, although the haptic devices 400A, 400B are shown in similar positions relative to the x, y, and z axes, in use, the user may position the haptic devices 400A, 400B (and haptic actuators 404A, 404B, 404C, 404D) in different positions, including different positions relative to one another. For example, if the user should move to the left (negative direction on the x-axis), one or both of the control circuits 405A, 405B may identify one or more of the haptic actuators 404A, 404B, 404C, 404D positioned in the negative direction on the x-axis and excite that haptic actuator, for example, at a higher or lower level than the remaining haptic actuators.

Figure 5:
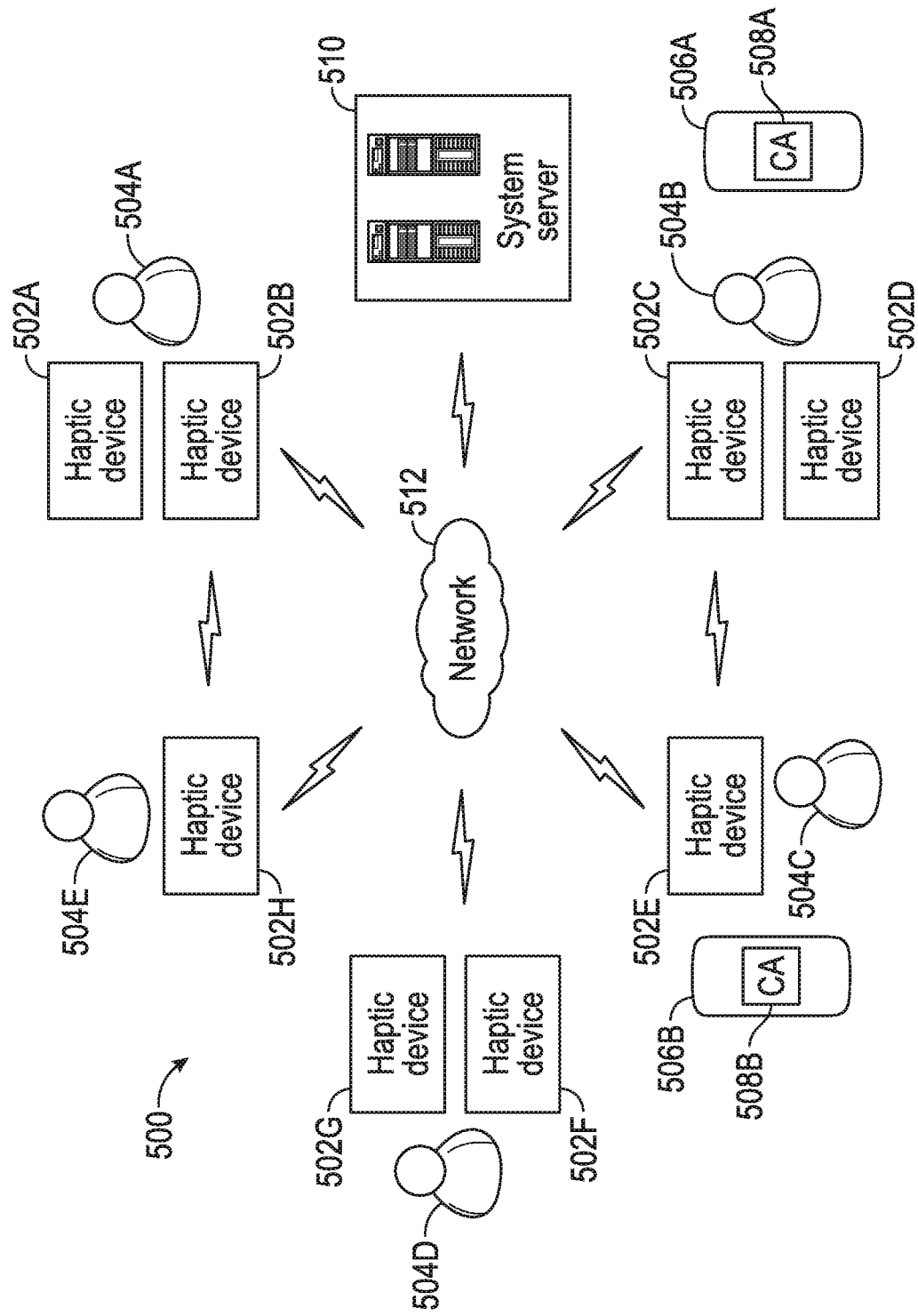
FIG. 5 is a diagram showing one example of an environment for manipulating virtual objects.

FIG. 5 is a diagram showing one example of an environment 500 for manipulating virtual objects. The environment shows users 504A, 504B, 504C, 504D, who may utilize equipment, such as haptic devices 502A, 502B, 502C, 502D, 502E, 502F, 502G, 502H and/or computing devices 506A, 506B, to manipulate virtual objects. Haptic devices 502A-H may be arranged, for example, according to any of the configurations described herein. In the example of FIG. 5, users 504C and 504E utilize a single haptic device. Users 504A, 504B, 504D may utilize multiple haptic devices, for example, as described herein with respect to FIG. 4.

In some examples, one or more of the users 504B, 504C may utilize a computing device, such as computing devices 506A, 506B, to communicate with and/or configure haptic devices 502C, 502D, 502E. Computing devices 506A, 506B may include any suitable devices for communicating with and/or configuring the haptic devices 502C, 502D, 502E. For example, computing devices 506A, 506B may include, smart phones, tablet computers, laptop computers, desktop computers, etc. Computing devices 506A, 506B may execute respective companion applications 508A, 508B. Companion applications 508A, 508B, when executed, may provide the users 504B, 504C with a user interface for receiving information about a current configuration of the haptic devices 502C, 502D, 502E and/or providing data for configuring the haptic devices 502C, 502D, 502E. Some haptic devices may include I/O devices for configuration without the need for a computing device and companion application. Examples of such I/O devices, which may be components of I/O circuits of the haptic devices, include displays, touch screens, keypads, etc.

In various examples, any user 504A, 504B, 504C, 504D, 504E may play virtual catch with a virtual projectile. When two or more of the users 504A, 504B, 504C, 504D, 504E play virtual catch with one another, their respective haptic devices may communicate with one another in any suitable manner. For example, haptic devices may communicate directly with one another utilizing a direct communications technology such as, Bluetooth®, NFC, etc. Also, in some examples, haptic devices of different users may make a peer-to-peer connection via the network 512, which may be or include any suitable type of wired or wireless network. Also, in some examples, haptic devices of different users may connect via a remote system 510. For example, the remote system 510 may be configured to match users 504A, 504B, 504C, 504D, 504E for games of virtual catch or other manipulation of virtual objects. As described in more detail below, users at different geographical locations may manipulate a virtual object, for example, by modifying the trajectory of the objection upon propulsion. In some examples, the remote system 510 may store projectile data describing different varieties of virtual projectiles that behave differently when thrown (e.g., a baseball, a football, a soccer ball, a dart, a boomerang, a frisbee, etc.). Different virtual projectiles may be selectable by users for play, as described herein. In some examples, a user may create projectile data for a type of projectile and upload the projectile data to the remote system 510 for sharing with other users. The remote system 510 may include any suitable types of computing device or devices including, for example, one or more servers.

Figure 6:
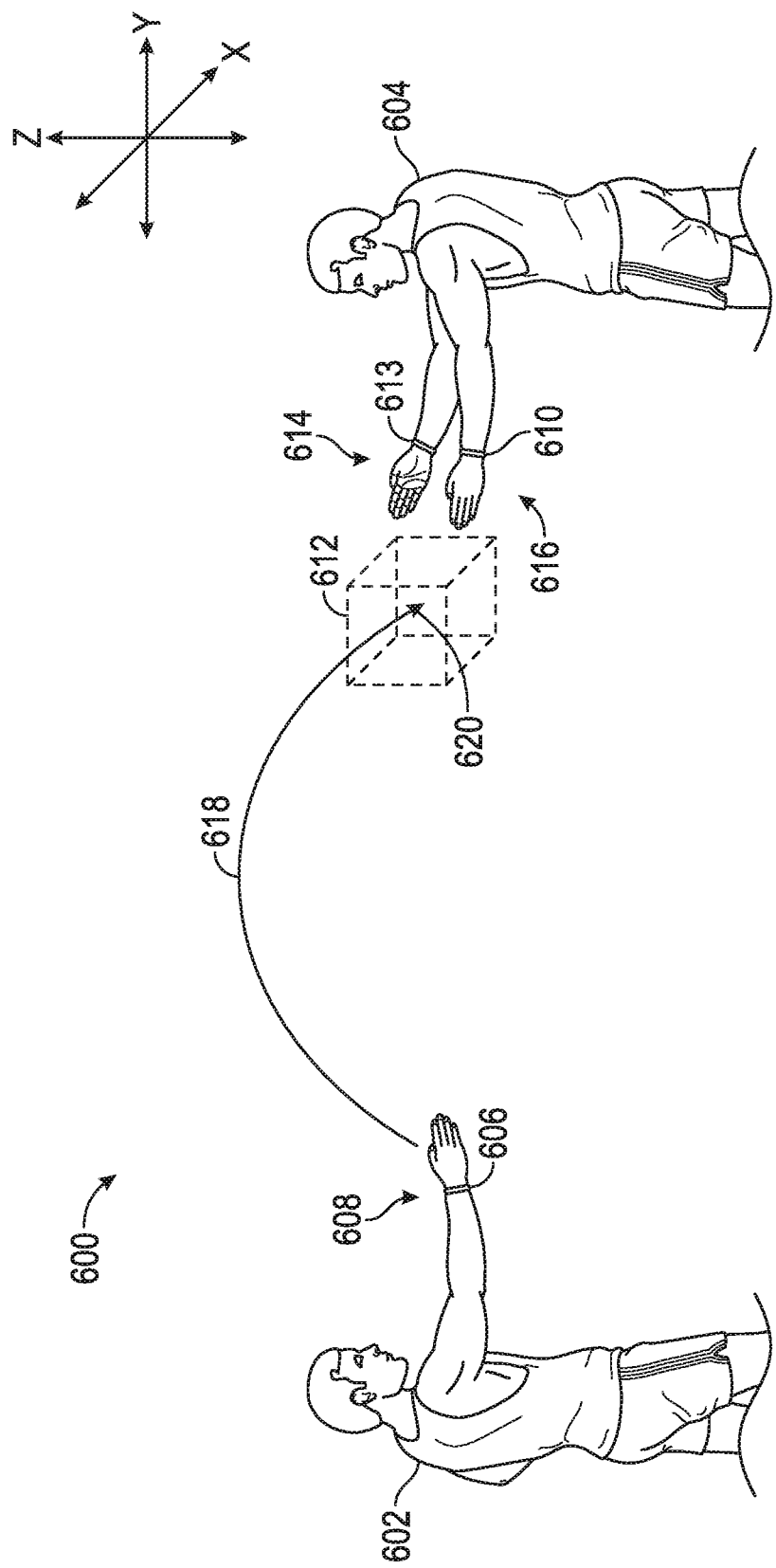
FIG. 6 is a diagram showing one example of an environment for manipulating a virtual object between two users.

FIG. 6 is a diagram showing one example of an environment 600 for manipulating a virtual object between two users 602, 604. The user 602 may make a propelling motion with the user's arm. A haptic device 606 positioned on the user's wrist 608 may detect the propelling motion as described. The haptic device 606 may determine a trajectory 618 of a virtual projectile and communicate the trajectory 618 to one or more haptic devices 610, 613 of the user 604, for example, worn on the wrists 616, 614 of the user 604. Although users 602, 604 wear the haptic devices 606, 610, 613 on their wrists 608, 614, 616, haptic devices may be held and/or worn by or on any suitable body part.

The trajectory 618 may describe a series of positions in three-dimensional space, represented by the x, y, and z axes shown in FIG. 6. The trajectory 618 may also describe a velocity of the virtual projectile along the trajectory 618. For example, upon receiving the trajectory 618 one or both of the haptic devices 613, 610 may be able to determine a position of the virtual projectile along the trajectory 618 at any given time.

FIG. 6 also illustrates an end 620 of the trajectory 618 (at the tip of the arrow head). The end 620 may be the place where the virtual projectile will be in virtual space after having virtually traversed the trajectory 618. FIG. 6 also shows a threshold volume 612 around the end 620 of the trajectory 618. For example, the user 604 may successfully receive the virtual projectile if the haptic devices 613, 610 determine that the wrists 614, 616 or other suitable body part of the user 604 are within the threshold volume 612 when the virtual projectile virtually arrives at the end 620 of the trajectory 618. The threshold volume 612 shown in FIG. 6 is a box centered at the end 620 of the trajectory 618, however any suitable shape may be used. In some examples, the threshold volume 612 is a sphere centered on the end 620.

Figure 7:
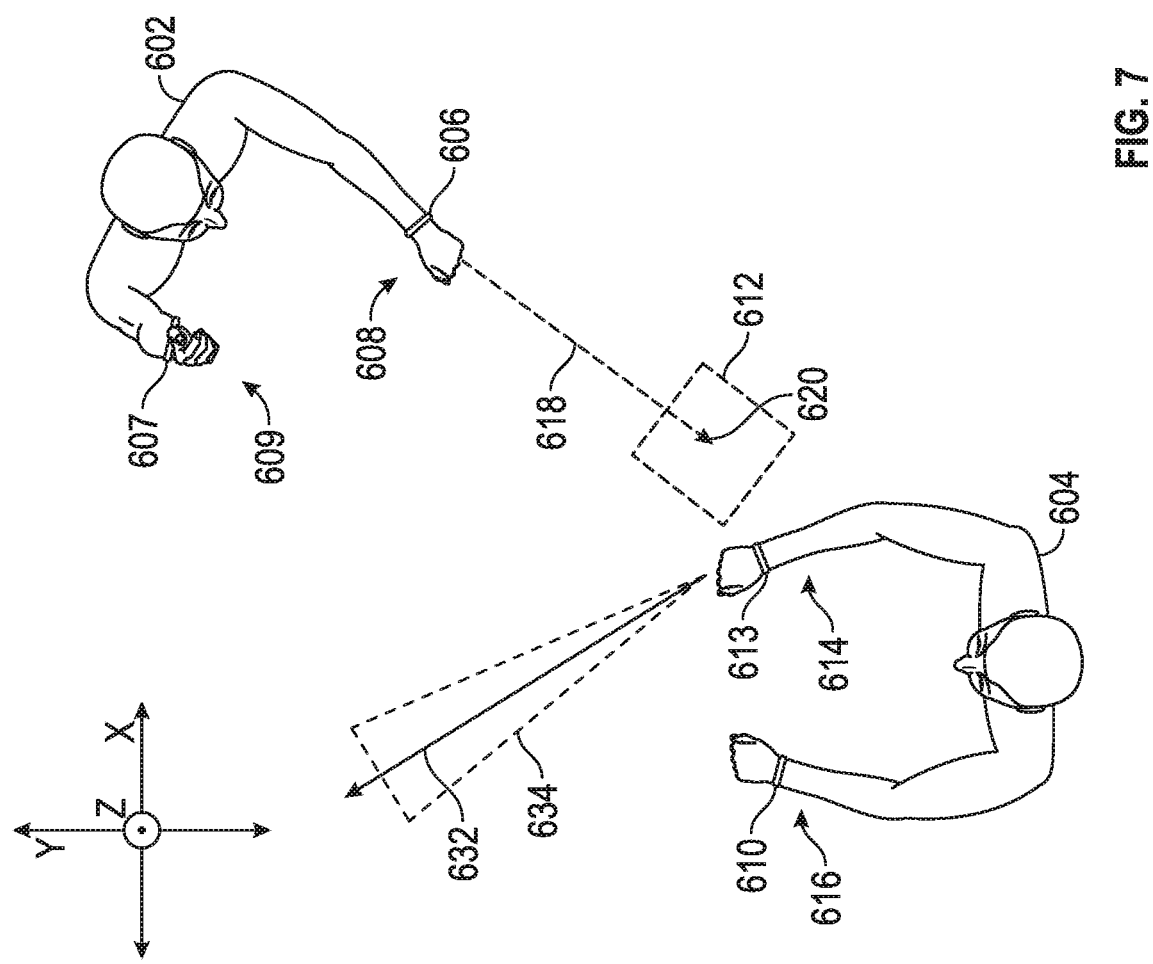
FIG. 7 is a diagram showing a top-down view of an example configuration of the environment of FIG. 6.
Figure 8:
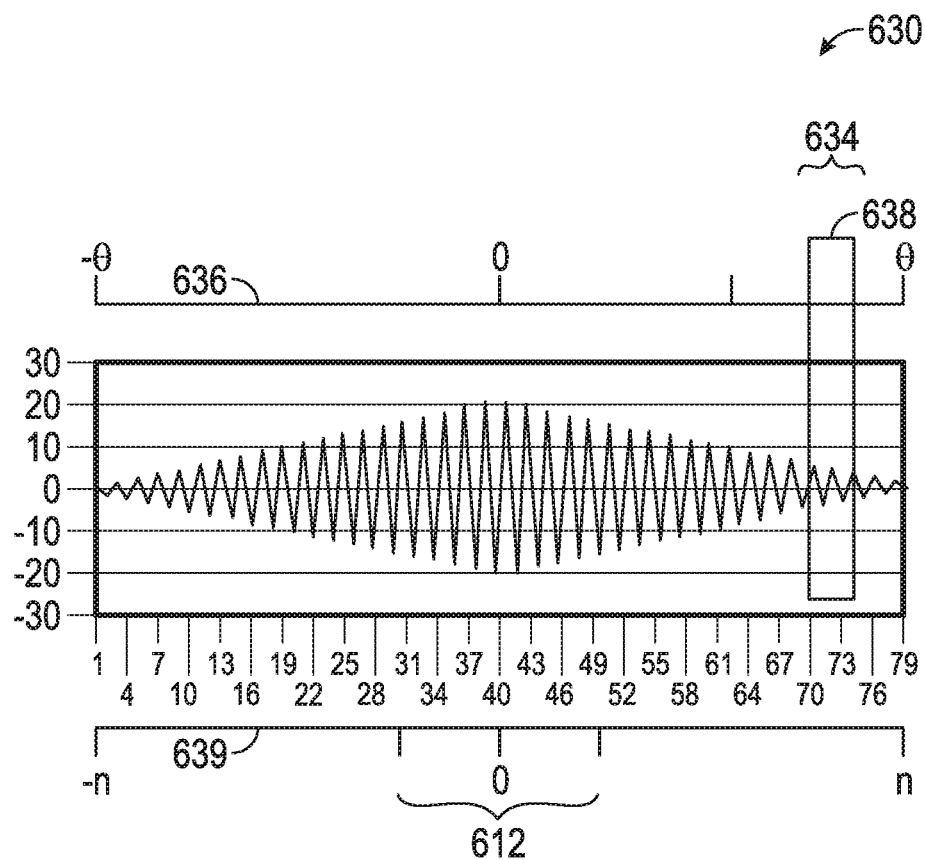
FIG. 8 is a plot showing one example haptic actuator response corresponding to the configuration of FIG. 7.

FIG. 7 is a diagram showing a top-down view of an example configuration of the environment 600 of FIG. 6. FIG. 8 is a plot showing one example of haptic actuator response 630 corresponding to the configuration of FIG. 7. The haptic actuator response 630 is plotted on a vertical axis representing haptic actuator level. In the example of FIGS. 7 and 8, haptic actuator level is an amplitude modulated onto a constant frequency drive signal. In other embodiments, however, the haptic actuator level may be a frequency of the drive signal. The haptic actuator response 630 is also plotted on a horizontal axis that may represent a distance between the user body parts (e.g., wrists 616, 614) and the threshold volume 612 (see axis 639) or an angular difference between the trajectory 618 and a direction vector 632 (see axis 636). FIG. 7 shows a second haptic device 607 on a second wrist 609 of the user 602. In various examples, one or both of the users 602, 604 may utilize one or more than one haptic device.

Referring to FIG. 8, on an axis 639, the haptic actuator response 630 may be at its highest level when the distance between the user body parts and the threshold volume 612 is zero (e.g., the body part or parts are at the end 620 of the trajectory 618). The axis 639 also shows the threshold volume 612. As the body parts move away from the end 620 of the trajectory 618, the level of the drive signal may be reduced. In this way, the user 604 may move the body part or parts to the threshold volume 612 to receive the virtual projectile. When the receiving user 604 uses a single haptic device, the position of the user's body part may be determined based on the position of the single haptic device. When the user 604 utilizes multiple haptic devices 610, 613, as shown, the distance between the body parts and the threshold volume 612 (for determining the haptic actuator response 630) may be determined in any suitable manner. For example, the distance may be the shortest distance between any haptic device 610, 613 utilized by the user 604 and the threshold area. Also, in some examples, the distance may be between an average position of the two or more haptic devices 610, 613 utilized by the user 604 and the end 620 of the trajectory 618.

Referring now to axis 636, the position of the body part or parts of the user 604 may also be measured by estimating a direction vector 632 indicating a direction of the body parts of the user 604 for receiving the virtual projectile (FIG. 7). For example, the direction vector 632 may be found by taking the midpoint of the shortest distance between the haptic devices 610, 613 utilized by the user 604. The vector 632 may extend from the midpoint in a direction normal to the distance. Axis 636 (FIG. 8) may represent an angular distance between the trajectory 618 and the direction user direction vector 632. The direction vector 632 is not plotted on the axis 636 of FIG. 8, although a box 638 shown in FIG. 8 illustrates a position (e.g., an estimated position) of the direction vector 632). The user 604 may be positioned to receive the virtual projectile when the direction vector 632 (and box 638) is offset from the trajectory 618 by less than a threshold angular distance 634. The threshold angular distance 634 is shown in FIG. 7 as a triangle or cone around the direction vector 632. On the axis 636 of FIG. 8, the threshold angular distance 634 is shown as an angular distance around the position of the box 638.

Figure 9:
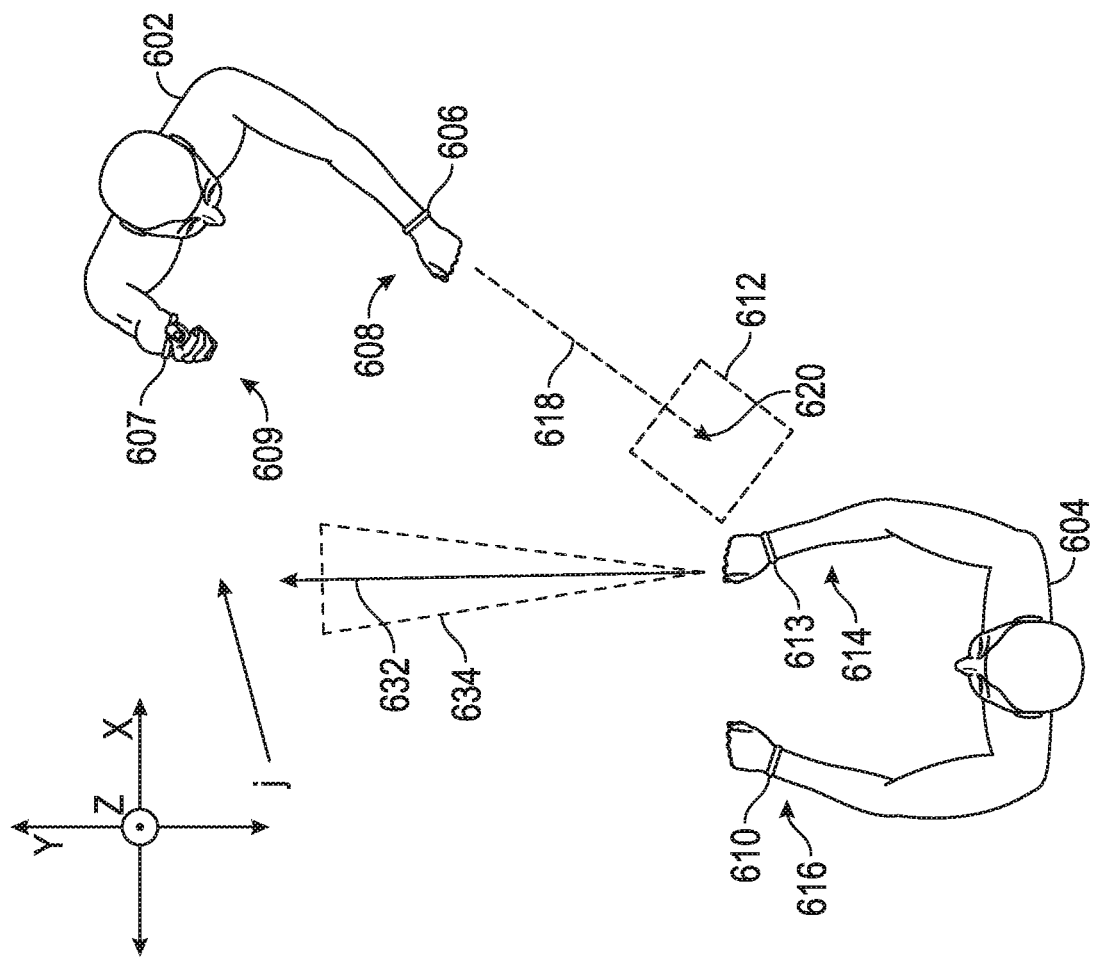
FIG. 9 is a diagram showing a top-down view of another example configuration of the environment.
Figure 10:
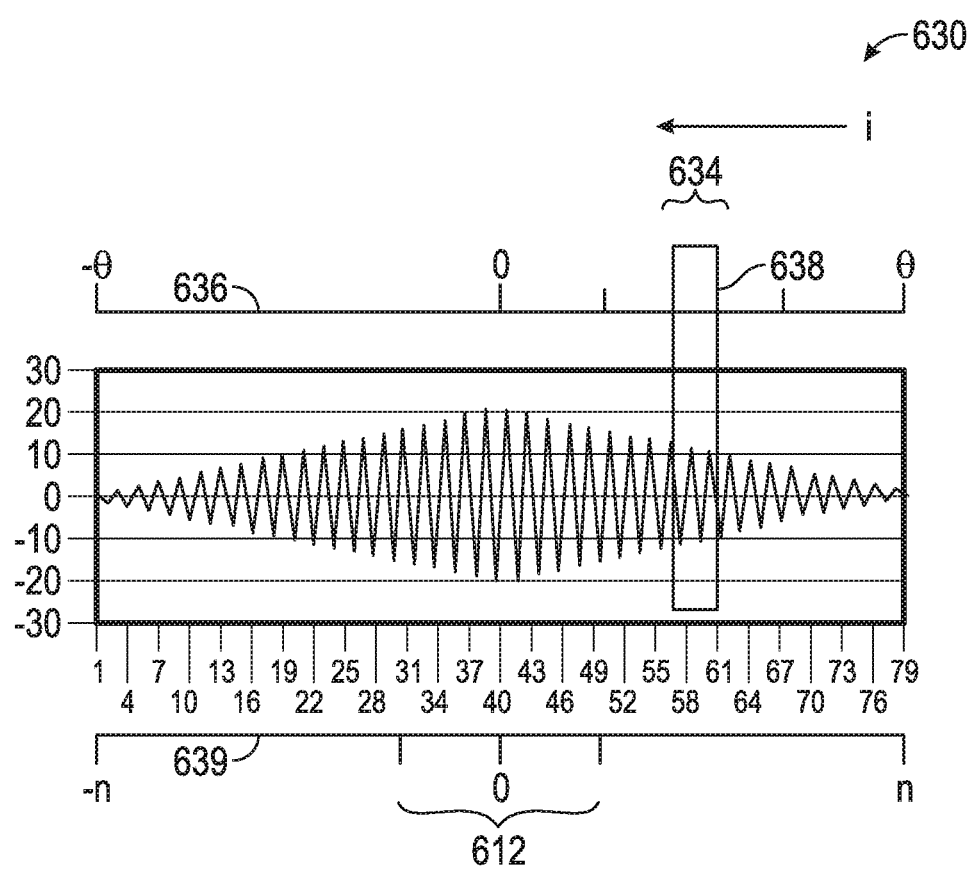
FIG. 10 is a plot showing one example of the haptic actuator response corresponding to the configuration of FIG. 9.

In the positions shown in FIGS. 7 and 8, the body parts of the user 604 may be offset from the end 620 of the trajectory by a distance indicated by the box 638 on the haptic actuator response 630. Similarly, the direction vector 632 may be offset from the trajectory 618 by an angle also indicated by the box 638. FIG. 9 is a diagram showing a top-down view of another example configuration of the environment 600. FIG. 10 is a plot showing one example of the haptic actuator response 630 corresponding to the configuration of FIG. 9. In the example of FIGS. 9 and 10, the user's body parts are moved towards the end 620 of the trajectory 618 in the xy plane. Accordingly, the haptic devices 610, 613 (and user body part or parts) are closer to the threshold volume 612. As illustrated in FIG. 10, the box 638 indicating the level of the drive signal for the haptic actuators of the haptic devices 610, 613 is shifted towards the zero point in the direction i. Also, in the configuration of FIG. 9, the direction vector 632 is rotated in the xy plane towards the trajectory in the direction j.

Figure 11:
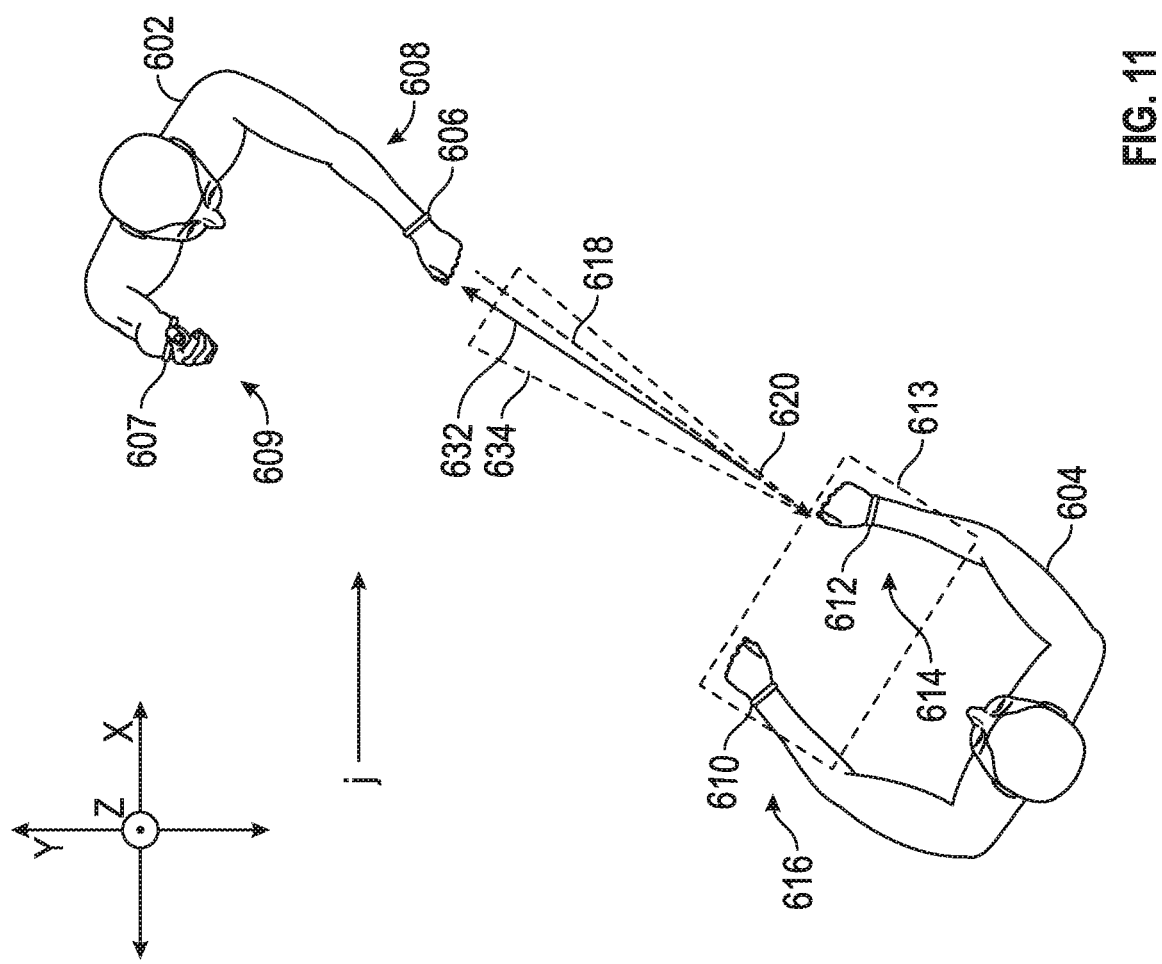
FIG. 11 is a diagram showing another example configuration of the environment.
Figure 12:
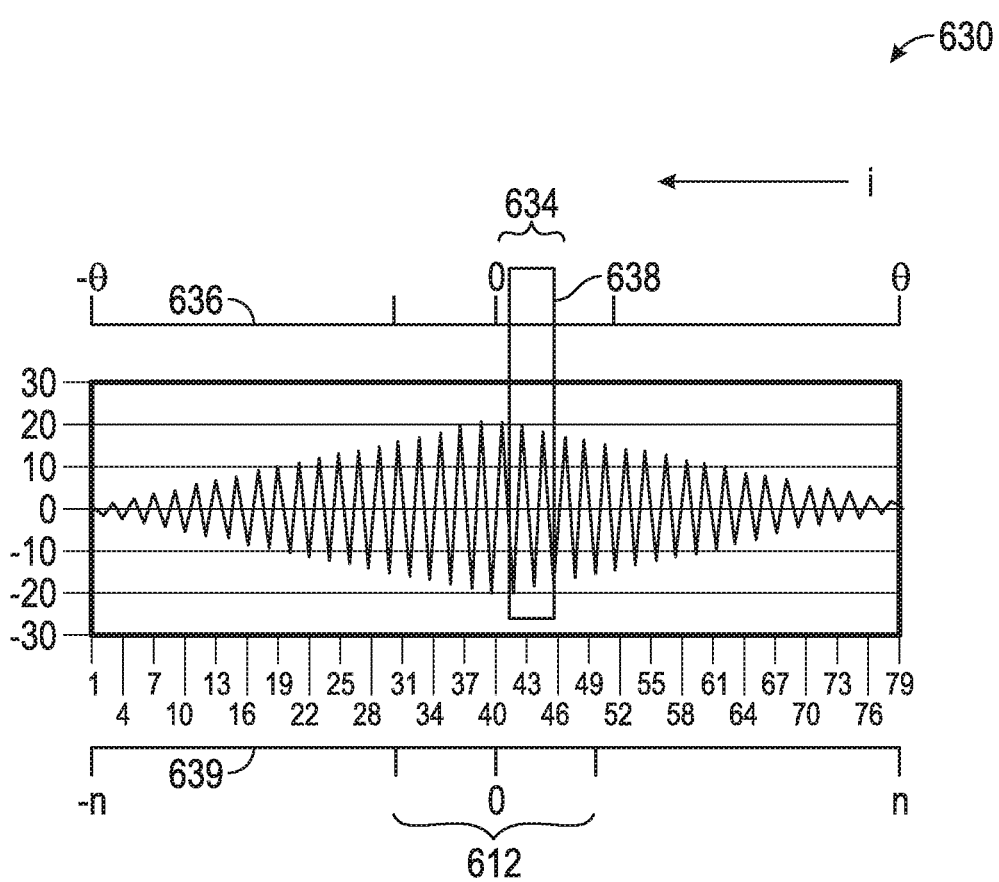
FIG. 12 is a plot showing one example of the haptic actuator response corresponding to the configuration of FIG. 11.

FIG. 11 is a diagram showing another example configuration of the environment 600. FIG. 12 is a plot showing one example of the haptic actuator response 630 corresponding to the configuration of FIG. 11. In FIGS. 11 and 12, the user 604 is further shifted towards the end point 620 of the trajectory 618 in the xy plane. For example, in FIG. 11, the position of the haptic devices 610, 613 is within the threshold volume 612. The direction vector 632 is shifted further in the direction j such that the trajectory is within the angular distance 634. Accordingly, the box 638 indicating the level of the drive signal for the haptic actuators of the haptic devices 610, 613 is shifted further towards the zero point in the direction i.

Although FIGS. 7-12 show two dimensional representations of the environment 600, the concepts illustrated in those figures can be extrapolated to three dimensions. For example, the haptic actuator response 630 may be determined based on distance between the user's body part or parts and the end 620 of the trajectory 618 in three dimensions rather than only a distance in the xy plane, as shown in FIGS. 7-12. Similarly, when an angular measurement is used. The haptic actuator response 630 may be determined based on an angle between the direction vector 632 and the trajectory 618 in three dimensional space rather than just in the xy plane.

In some examples, the haptic devices 610, 613, 606, 607 may be configured to differentially excite haptic actuators to instruct the user how to move to receive the virtual projectile. For example, if the end 620 of the trajectory is above the wrists 616, 614 of the user 604 in the z-axis direction, the haptic device 610 and/or 613 may identify one or more haptic actuators that are pointed up in the z-axis direction given the current alignment of the user's wrists 616, 614. The haptic actuators pointed up in the z-axis direction may be excited at a different level than other haptic actuators of the haptic devices 610, 613, for example, at a higher level, at a lower level, etc.

Figure 13:
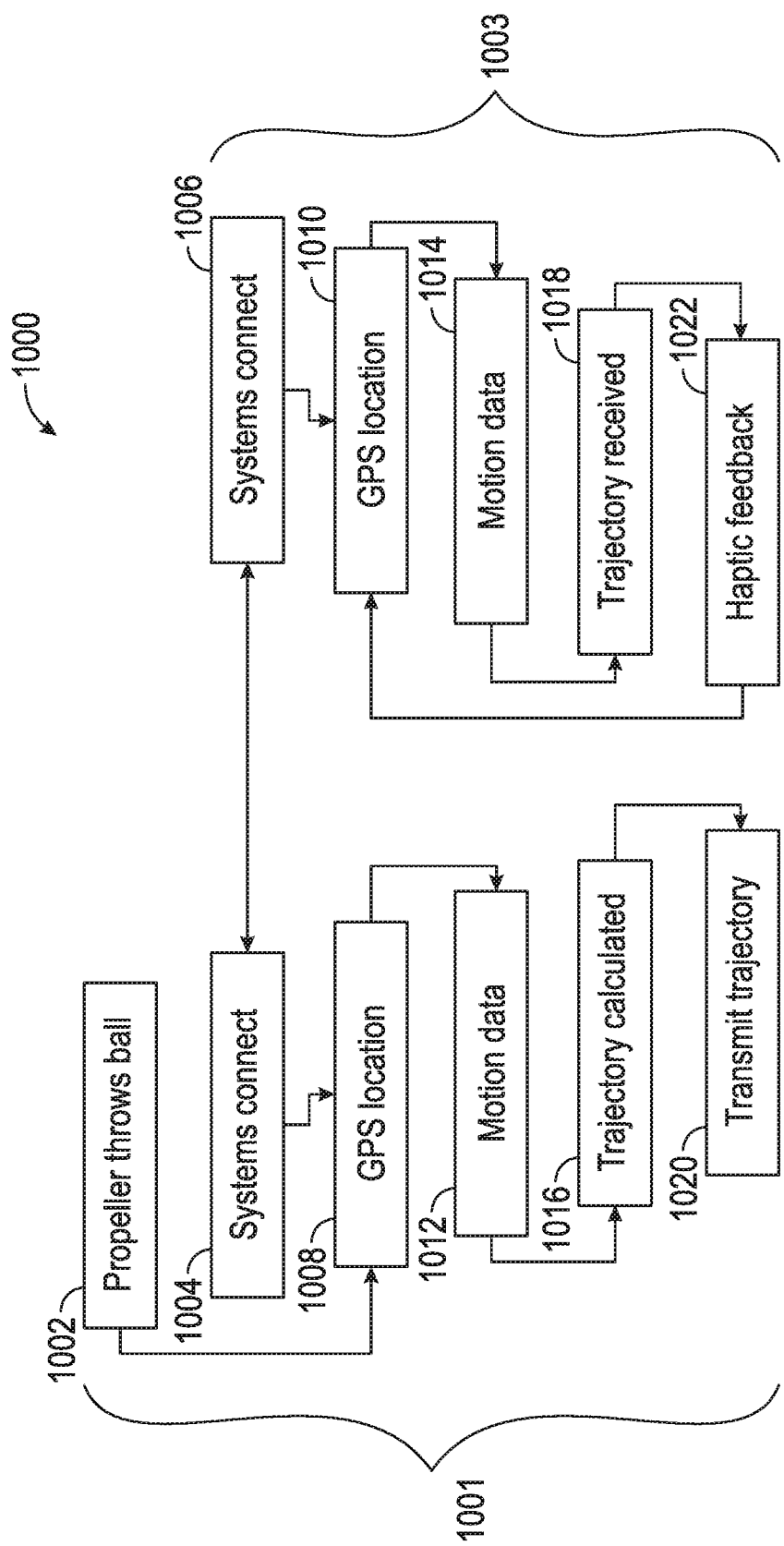
FIG. 13 is a flowchart showing one example of a process flow that may be executed by a set of haptic devices to manipulate a virtual object.

FIG. 13 is a flowchart showing one example of a process flow 1000 that may be executed by a set of haptic devices to manipulate a virtual object. The process flow 1000 includes two columns. A first column 1001 shows actions that may be performed by a haptic device of a propelling user. A second column 1003 shows actions that may be performed by a haptic device of a receiving user. Although the actions of the process flow 1000 are described with a single propelling haptic device and a single receiving haptic device, in some examples, one or more of the users may have multiple paired haptic devices, as described herein.

At actions 1004 and 1006, the propelling haptic device and the receiving haptic device may establish a communications connection. The connection may be directly between the haptic devices, via a network, and/or via a system server. At action 1002, the propelling haptic device may detect a propelling motion by the propelling user (e.g., a throwing or kicking motion). At 1008, the propelling haptic device may determine its own location, for example, utilize GPS. At action 1012, the propelling haptic device may receive motion data describing the propelling motion. The motion data may include, for example, acceleration data (e.g., received from an accelerometer) describing a direction and magnitude of acceleration of the propelling haptic device, for example, throughout the propelling motion. In some examples, the motion data may also include orientation data (e.g., received from a gyroscope sensor) describing the orientation of the haptic device, for example, throughout the propelling motion. At action 1016, the propelling haptic device may calculate a trajectory of the virtual projectile. At action 1020, the trajectory may be transmitted to the receiving haptic device, for example, via the connection established at 1004. (In some examples, the propelling haptic device may provide the motion data to a remote system, which may calculate the trajectory and transmit it to the receiving haptic device.)

At action 1010, the receiving haptic device may determine its location, for example, utilizing GPS. At action 1014, the receiving haptic device may receive motion data such as, for example, acceleration data and/or orientation data. At action 1018, the receiving haptic device may receive the trajectory. At action 1022, the receiving haptic device may provide haptic feedback by exciting one or more haptic actuators. The receiving haptic device may continue to determine its location at action 1010 and motion at action 1014 to update the haptic feedback provided at action 1022.

Figure 14:
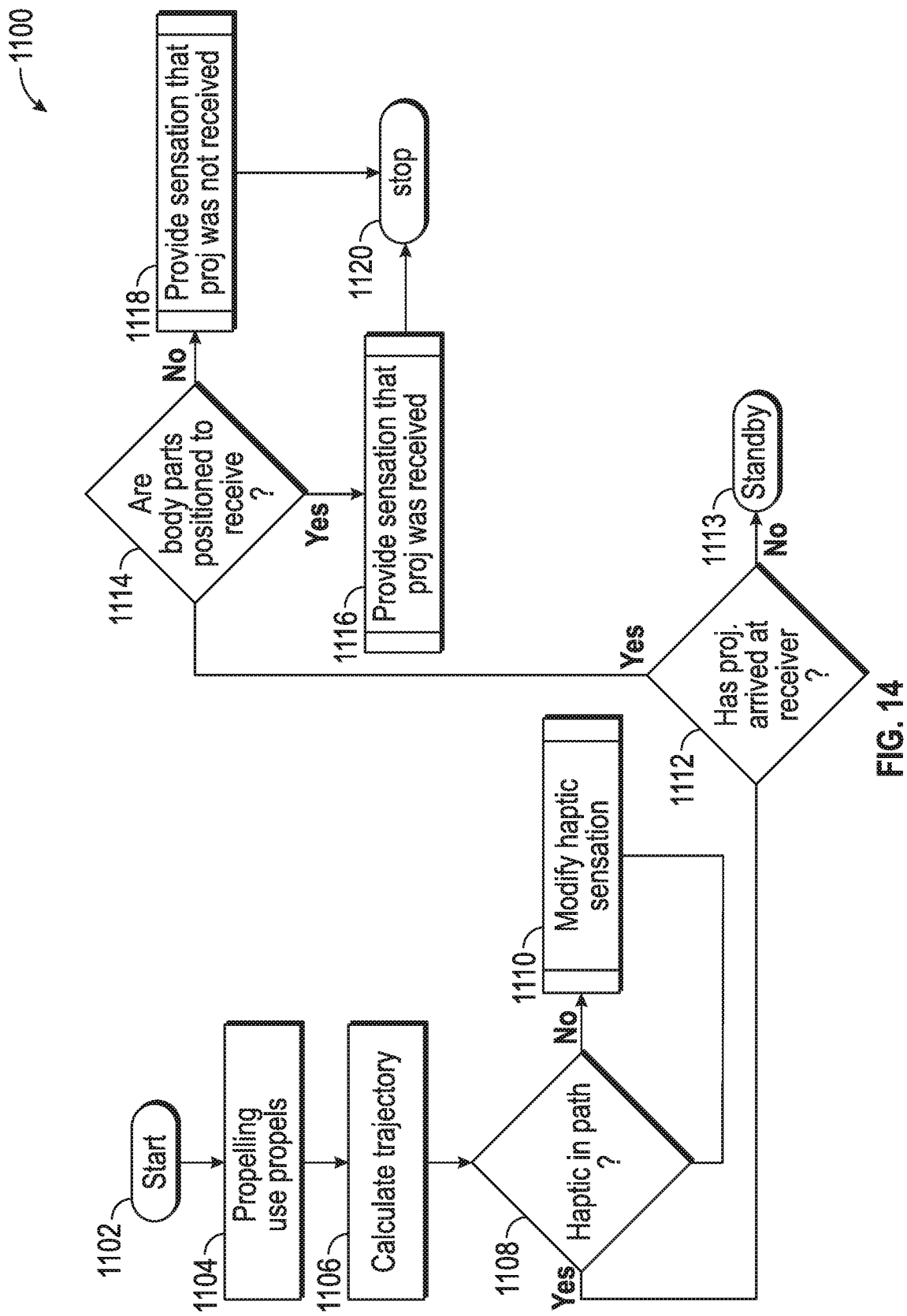
FIG. 14 is a flowchart showing one example of a process flow that may be executed by a set of haptic devices to manipulate a virtual object.

FIG. 14 is a flowchart showing one example of a process flow 1100 that may be executed by a set of haptic devices to manipulate a virtual object. The process flow may start at action 1102. At action 1104, a propelling user may make a propelling motion (e.g., throwing, kicking, etc.). At 1106, a propelling haptic device may determine a trajectory of a virtual projectile propelled by the propelling motion. At 1108, the propelling haptic device may determine whether there is a receiving haptic device positioned to receive the virtual projectile. For example, the propelling haptic device may query for receiving haptic devices within a threshold distance of the end of the trajectory. If no receiving haptic device is present, the propelling haptic device may modify an excitation of one or more haptic actuators to indicate to the propelling user that there is no user positioned to receive the virtual projectile. For example, the receiving haptic device may increase or decrease a level of excitation of one or more haptic actuators to indicate the lack of a receiving haptic device.

If a receiving haptic device is present, the receiving haptic device may, at action 1112, determine whether the virtual projectile has arrived at the receiving haptic device. If not, the receiving haptic device may standby at action 1113. Alternatively, instead of standing by, the receiving haptic device may measure the position of the receiving user's body part or parts relative to the end of the trajectory and excite one or more haptic actuators to direct the user to place the body parts to receive the virtual projectile, as described herein. If the virtual projectile has arrived at the end of the trajectory, the receiving haptic device may, at action 1114, determine whether the body part or parts of the receiving user are positioned to receive the virtual projectile (e.g., whether the end of the trajectory is within a range of the vector, such as 632 and/or whether the body part or parts are within a threshold area, such as 612). If not, the receiving haptic device may, at action 1118, excite one or more haptic actuators to indicate that the virtual projectile was not received and may terminate at action 1120. If yes, the receiving haptic device may, at action 1116, excite one or more haptic actuators to indicate that the virtual projectile was received and may terminate at action 1120.

Figure 15:
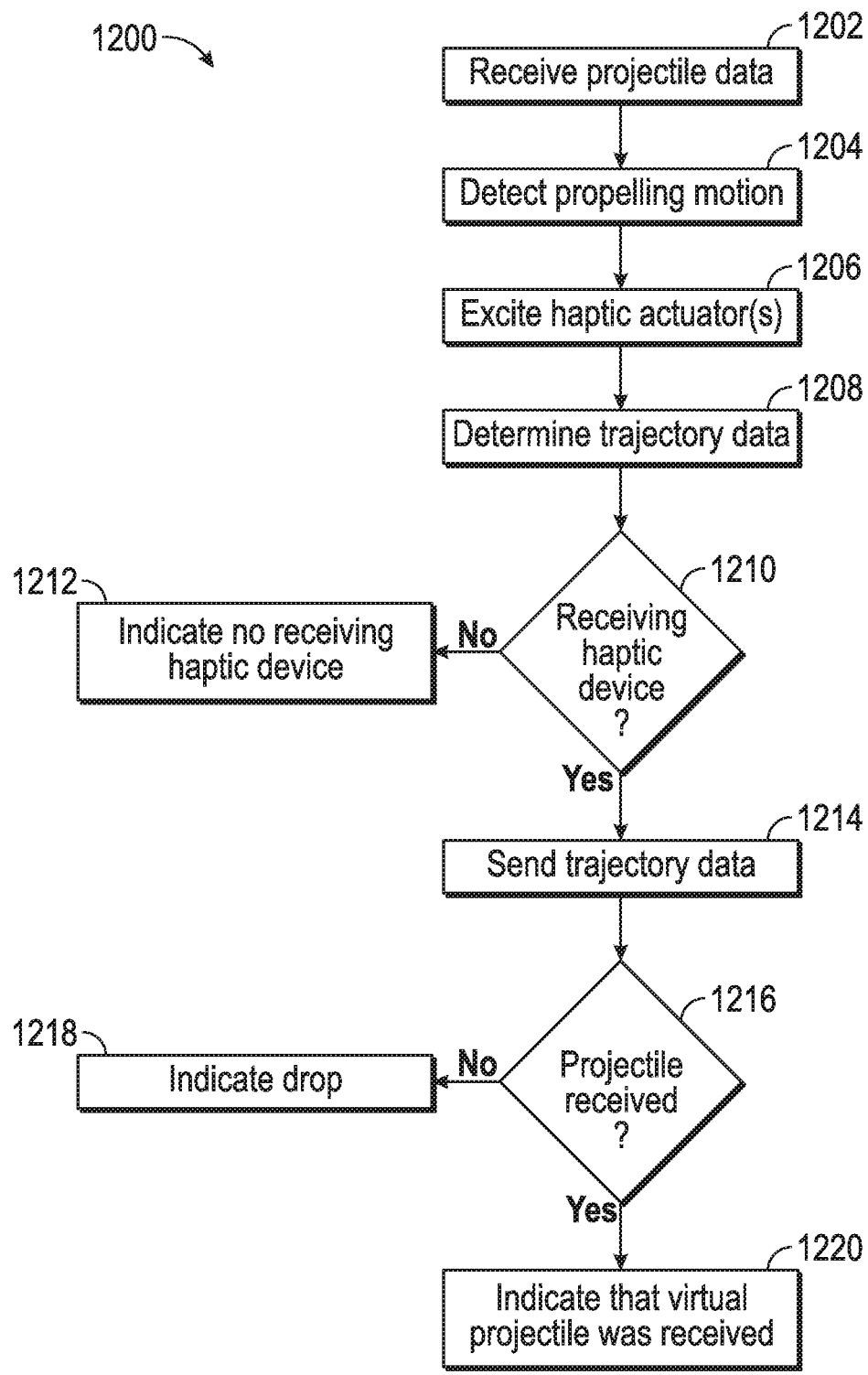
FIG. 15 is a flowchart showing one example of a process flow that may be executed by a haptic device to propel a virtual projectile.

FIG. 15 is a flowchart showing one example of a process flow 1200 that may be executed by a haptic device to propel a virtual projectile. At action 1202, the haptic device may receive projectile data describing the virtual projectile. In some examples, projectile data may be stored at the haptic device, stored at a companion computing device, and/or received from a third party system, such as the server system 510 described above. Projectile data may include, for example, a type of virtual projectile, a size of the virtual projectile, a weight of the virtual projectile, etc. In some example, projectile data may be received by the I/O circuit of the haptic device and/or from a computing device via a companion application. In some examples, projectile data may include virtual physics data describing a virtual law of physics different than a natural law of physics. For example, a virtual law of physics may include alternate values for physical properties such as the acceleration due to gravity, force due to air resistance, terminal velocity of the virtual projectile, etc. For example, the propelling user may indicate that the trajectory is to be calculated as though gravity was ½ of its real value or as if there was no air resistance. Also, in some examples, the projectile data may indicate a geographic destination of the virtual projectile. For example, the propelling user may desire to propel the virtual projectile to a receiving user farther from the propelling user than a human being can typically through a projectile (e.g., several miles away, in another city or geographic region, etc.). In some examples, the haptic device may be configured to modify the virtual projectile data based on the actions of the users. For example, if the propelling motion is faster than is physically permissible for the selected virtual projectile more than a threshold number of times (e.g., 3 times) the haptic device may select new virtual projectile data better corresponding to the propelling motion of the user.

At action 1204, the haptic device may detect a propelling motion, for example, based on motion data received from one or more motion sensors. At action 1206, the haptic device may excite one or more haptic actuators, for example, during the propelling motion. For example, the haptic device may excite one or more haptic actuators to simulate the feeling of propelling the virtual projectile. The haptic device, in some examples, may continue to excite the haptic actuator until an estimated release point is reached. The haptic device may determine the estimated release point in any suitable manner including, for example, the haptic device may, based on the motion signal, determine when the user's body part is parallel to the ground. In some examples, the haptic device may select a virtual projectile based on the propelling motion. For example, if the user makes an overhand motion with the palm of the hand facing forward, the haptic device may select a baseball-type virtual projectile. If the user makes a two-handed propelling motion, the haptic device may select a basketball-type virtual projectile. If the user makes a kicking motion, the haptic device may select a soccer ball-type virtual projectile.

At action 1208, the haptic device may determine trajectory data for the virtual projectile. Trajectory data may describe the trajectory of the virtual projectile and may be determined based on the propelling motion and on the projectile data. For example, the haptic device may determine an initial speed and an initial direction of the virtual projectile for the trajectory. The speed may be determined, for example, by the speed and/or acceleration of the user's body part holding and/or wearing the haptic device during the propelling motion as indicated by motion data generated by the motion sensors. The direction, for example, may be determined by the direction of the propelling motion, as indicated by motion data generated by the motion sensors. The haptic device may find the trajectory from the direction and speed as well as physical properties affecting the trajectory such as, for example, the mass of the virtual projectile, air resistance to the virtual projectile based on its shape, other aerodynamic properties of the virtual projectile, etc.

At action 1210, the haptic device may determine if a receiving haptic device is present at or within a threshold distance of the end of the trajectory. If no, the haptic device may indicate that there is no receiving haptic device (or user) for the virtual projectile, for example, by exciting the haptic actuator or actuators of the haptic device, by emitting a sound or light, or by any other suitable method. If yes, at action 1214, the haptic device may send the trajectory data directly or indirectly to one or more receiving haptic devices. In some examples, if a receiving haptic device is present, the haptic device may send a message to the receiving haptic device indicating that the virtual projectile is on its way. The receiving haptic device, in some examples, may excite one or more of its haptic actuators to indicate to the user that a virtual projectile is on the way.

At action 1216, the haptic device may determine whether the virtual projectile was received by a receiving haptic device. For example, the haptic device may receive a message from the receiving haptic device indicating that the virtual projectile was either received or dropped. Also, in some examples, if the haptic device fails to receive a message indicating a receipt or drop of the virtual projectile within a threshold time of propelling the virtual projectile (e.g., a threshold time after the virtual projectile would have reached the end of the trajectory), the haptic device may determine that the virtual device was dropped (e.g., not received). If the virtual projectile is not received (e.g., dropped), the haptic device may indicate a drop, for example, by generating any kind of audible, visual, or haptic feedback. Similarly, if the virtual projectile was received, the haptic device may indicate that the virtual projectile was received, for example, by generating any kind of audible, visual, or haptic feedback.

Figure 16:
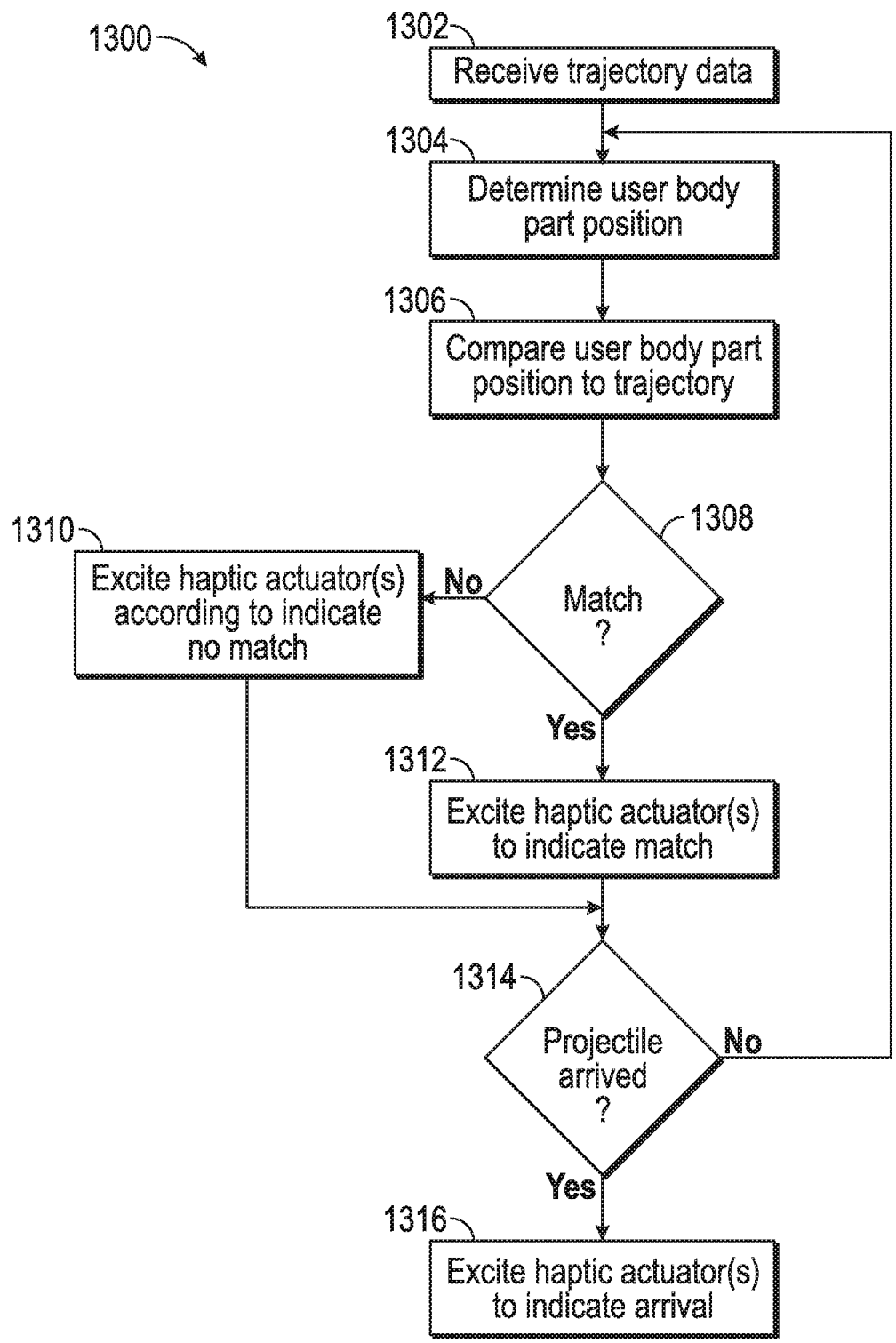
FIG. 16 is a flowchart showing one example of a process flow that may be executed by a haptic device to receive a virtual projectile.

FIG. 16 is a flowchart showing one example of a process flow 1300 that may be executed by a haptic device to receive a virtual projectile. At action 1302, the haptic device may receive trajectory data, for example, directly or indirectly from a propelling haptic device. The trajectory may describe a direction and speed of a virtual projectile. In some examples, the trajectory may also describe a path that the virtual projectile will take including, for example, an end of the trajectory. At action 1304, the haptic device may determine a user body part position. The user body part position may describe the position of one or more user body parts. For example, when one haptic device is used, the user body part position may be a position of a body part wearing or holding the haptic device. When multiple haptic devices are used, the user body part position may be an average position of the body part or body parts holding or wearing the haptic devices, a vector similar to the direction vector 632 described above, etc.

At action 1306, the haptic device may compare the user body part position (or vector) to the trajectory and/or to an end of the trajectory, as described herein. At action 1308, the haptic device may determine whether there is a match between the user body part position or vector and the trajectory or end of the trajectory. For example, there may be a match if the user body part position is within a threshold area, such as threshold volume 612. Also, in some examples, there may be a match if the trajectory is within a threshold angular distance of a direction vector of the body parts. If a match is found at action 1308, the haptic device may, at action 1312, excite one or more haptic actuators to indicate the match, for example, as shown in FIG. 9. If no match is found the haptic device may excite one or more haptic actuators to indicate no match 1310.

At 1314, the haptic device may determine whether the virtual projectile has arrived (e.g., whether the virtual projectile has reached the end of the trajectory). If yes, not the haptic device may return to action 1304. If no, the haptic device may excite one or more haptic actuators to indicate the arrival of the virtual projectile. If the virtual projectile was successfully received, the haptic device may excite the haptic actuators according to a received level and if the virtual projectile was not successfully received, the haptic device may excite the haptic actuators according to a not received level.

Figure 17:
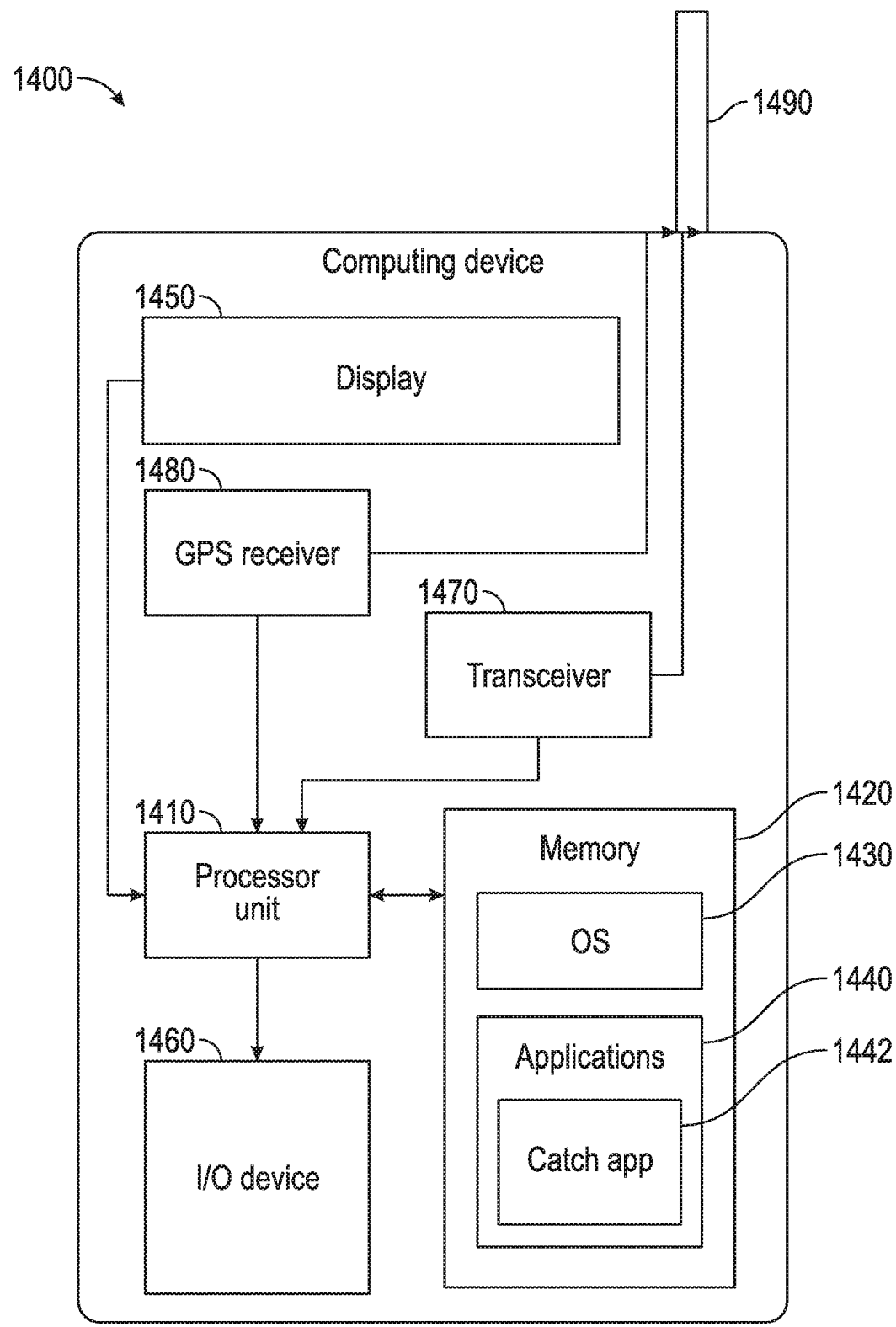
FIG. 17 is a block diagram showing an example architecture of a mobile computing device.

FIG. 17 is a block diagram showing an example architecture 1400 of a computing device. In some examples, one or more of the haptic devices and/or computing devices described herein may be implemented according to the architecture 1400. The architecture 1400 comprises a processor unit 1410. The processor unit 1410 may include one or more processors. Any of a variety of different types of commercially available processors suitable for mobile computing devices may be used (for example, an XScale architecture microprocessor, a Microprocessor without Interlocked Pipeline Stages (MIPS) architecture processor, or another type of processor). A memory 1420, such as a Random Access Memory (RAM), a Flash memory, or other type of memory or data storage, is typically accessible to the processor. The memory 1420 may be adapted to store an operating system (OS) 1430, as well as applications 1440. The memory 1420 may also include a catch app 1442. The catch app 1442 may execute any of the process flows described herein.

The processor unit 1410 may be coupled, either directly or via appropriate intermediary hardware, to a display 1450 and to one or more input/output (I/O) devices 1460, such as a keypad, a touch panel sensor, a microphone, and the like. Similarly, in some examples, the processor 1410 may be coupled to a transceiver 1470 that interfaces with an antenna 1490. The transceiver 1470 may be configured to both transmit and receive cellular network signals, wireless data signals, or other types of signals via the antenna 1490, depending on the nature of the mobile computing device implemented by the architecture 1400. Although one transceiver 1470 is shown, in some examples, the architecture 1400 includes additional transceivers. For example, a wireless transceiver may be utilized to communicate according to an IEEE 802.11 specification, such as Wi-Fi and/or to a short range communication medium, such as Bluetooth®, near field communication (NFC), etc. Some short range communication mediums, such as NFC, may utilize a separate, dedicated transceiver. Further, in some configurations, an optional GPS receiver 1480 makes use of the antenna 1490 to receive GPS signals.

Figure 18:
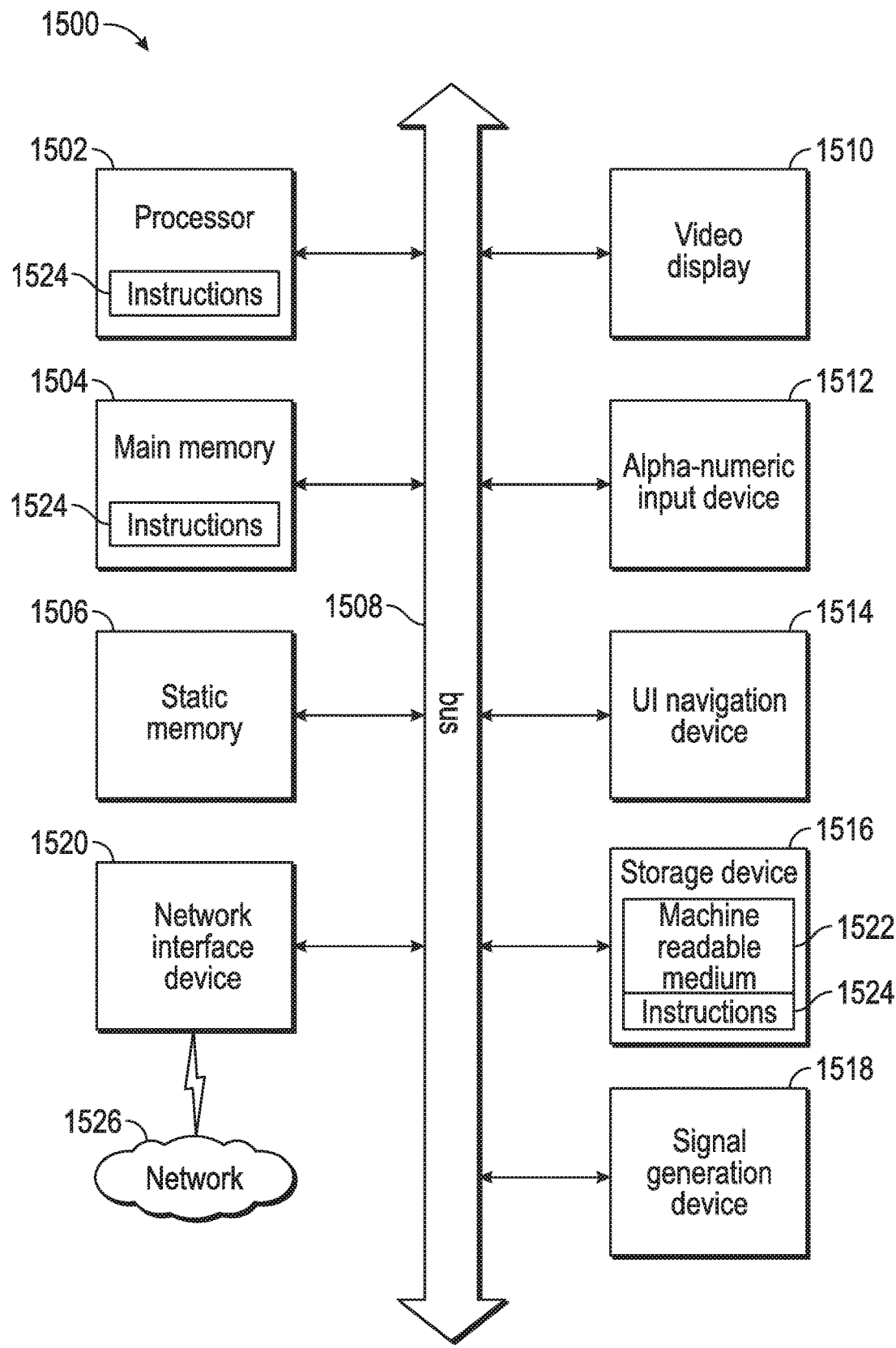
FIG. 18 is a block diagram illustrating a computing device hardware architecture, within which a set or sequence of instructions may be executed to cause the machine to perform examples of any one of the methodologies discussed herein.

FIG. 18 is a block diagram illustrating a computing device hardware architecture 1500, within which a set or sequence of instructions may be executed to cause the machine to perform examples of any one of the methodologies discussed herein. The architecture 1500 may operate as a standalone device or may be connected (e.g., networked) to other machines. In a networked deployment, the architecture 1500 may operate in the capacity of either a server or a client machine in server-client network environments, or it may act as a peer machine in peer-to-peer (or distributed) network environments. The architecture 1500 may be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine.

Example architecture 1500 includes a processor unit 1502 comprising at least one processor (e.g., a central processing unit (CPU), a graphics processing unit (GPU) or both, processor cores, compute nodes, etc.). The architecture 1500 may further comprise a main memory 1504 and a static memory 1506, which communicate with each other via a link 1508 (e.g., bus). The architecture 1500 may further include a video display unit 1510, an alphanumeric input device 1512 (e.g., a keyboard), and a user interface (UI) navigation device 1514 (e.g., a mouse). In some examples, the video display unit 1510, input device 1512 and UI navigation device 1514 are incorporated into a touch screen display. The architecture 1500 may additionally include a storage device 1516 (e.g., a drive unit), a signal generation device 1518 (e.g., a speaker), a network interface device 1520, and one or more sensors (not shown), such as a global positioning system (GPS) sensor, compass, accelerometer, or other sensor.

The storage device 1516 includes a machine-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504, static memory 1506, and/or within the processor 1502 during execution thereof by the architecture 1500, with the main memory 1504, static memory 1506, and the processor 1502 also constituting machine-readable media. Instructions stored at the machine-readable medium 1522 may include, for example, instructions for implementing any of the features described herein, etc.

While the machine-readable medium 1522 is illustrated in an example to be a single medium, the term "machine-readable medium" may include a single medium or multiple media (e.g., a centralized or distributed database, and/or associated caches and servers) that store the one or more instructions 1524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1524 may further be transmitted or received over a communications network 1526 using a transmission medium via the network interface device 1520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples, as described herein, may include, or may operate on, logic or a number of components, engines, or modules, circuits, which for the sake of consistency are termed circuits, although it will be understood that these terms may be used interchangeably. Circuits may be hardware, software, or firmware communicatively coupled to one or more processors in order to carry out the operations described herein. Circuits may be hardware circuits, and as such circuits may be considered tangible entities capable of performing specified operations and may be configured or arranged in a certain manner In an example, circuits may be arranged (e.g., internally or with respect to external entities such as other circuits) in a specified manner as a circuit. In an example, the whole or part of one or more computing platforms (e.g., a standalone, client or server computing platform) or one or more hardware processors may be configured by firmware or software (e.g., instructions, an application portion, or an application) as a circuit that operates to perform specified operations. In an example, the software may reside on a machine-readable medium. In an example, the software, when executed by the underlying hardware of the circuit, causes the hardware to perform the specified operations. Accordingly, the term hardware circuit is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which circuits are temporarily configured, each of the circuits need not be instantiated at any one moment in time. For example, where the circuits comprise a general-purpose hardware processor configured using software; the general-purpose hardware processor may be configured as respective different circuits at different times. Software may accordingly configure a hardware processor, for example, to constitute a particular circuit at one instance of time and to constitute a different circuit at a different instance of time.

ADDITIONAL NOTES & EXAMPLES

Example 1 is a haptic device for manipulating a virtual projectile, comprising: an input/output (I/O) circuit to receive trajectory data describing a trajectory of the virtual projectile; a position circuit to determine a first position of a body part of a user based at least in part on a motion signal received from a motion sensor; a comparator circuit to determine a first distance between the first position of the body part and the trajectory; a feedback circuit to excite a haptic actuator of the haptic device at a first level; wherein the position circuit is to, after determining the first position of the body part, determine a second position of the body part; wherein the comparator circuit is to determine a second distance between the second position of the body part and the trajectory, wherein the second distance is different than the first distance; and wherein the feedback circuit is to excite the haptic actuator at a second level different than the first level.

In Example 2, the subject matter of Example 1 optionally includes: wherein the position circuit is to, after determining the second position of the body part, determine a third position of the body part; wherein the comparator circuit is to determine that a third distance between the second position of the body and the trajectory is less than a threshold distance; and wherein the feedback circuit is to excite the haptic actuator at a third level different than the first level and the second level.

In Example 3, the subject matter of any one or more of Examples 1-2 optionally include wherein the haptic actuator comprises a rotating motor and an eccentric rotating mass, wherein exciting the haptic actuator at the first level comprises rotating the motor at a first rotational speed, and wherein exciting the haptic actuator at the second level comprises rotating the motor at a second rotational speed different than the first rotational speed.

In Example 4, the subject matter of any one or more of Examples 1-3 optionally include wherein exciting the haptic actuator at the first level comprises exciting the haptic actuator at a first amplitude, and wherein exciting the haptic actuator at the second level comprises exciting the haptic actuator at a second amplitude different than the first amplitude.

In Example 5, the subject matter of any one or more of Examples 1-4 optionally include wherein the comparator circuit is to determine that virtual projectile is at an end of the trajectory, wherein the position circuit is to determine a third position of the body part when the virtual projectile is at the end of the trajectory, wherein the comparator circuit is to determine that the third position of the body part is within a threshold distance of the trajectory when the virtual projectile is at the end of the trajectory, and wherein the feedback circuit is to excite the haptic actuator at a third level indicating that the virtual projectile was received.

In Example 6, the subject matter of any one or more of Examples 1-5 optionally include wherein the comparator circuit is to determine that virtual projectile at an end of the trajectory, wherein the position circuit is to determine a third position of the body part when the virtual projectile is at the end of the trajectory, wherein the comparator circuit is to determine that the third position of the body part is not within a threshold distance of the end of the trajectory when the virtual projectile is at the end of the trajectory, and wherein the feedback circuit is to excite the haptic actuator at a third level indicating that the virtual projectile was not received.

In Example 7, the subject matter of any one or more of Examples 1-6 optionally include: wherein the I/O circuit is to receive projectile data describing a second virtual projectile; wherein the motion sensor is to generate a second motion signal describing a second motion of the haptic device; wherein the position circuit is to determine that the second motion of the haptic device is a propelling motion;

wherein the feedback circuit is to excite the haptic actuator at a third level indicating propelling of the second virtual projectile; wherein the position circuit is to determine trajectory data for the second virtual projectile based at least in part on the second motion signal; and wherein the I/O circuit is to send the trajectory data to at least a second haptic device.

In Example 8, the subject matter of any one or more of Examples 1-7 optionally include wherein the haptic device further comprises: a body configured to be positioned around a wrist of the user, wherein the haptic actuator is coupled to the body at a first position; and a second haptic actuator coupled to the body at a second position.

In Example 9, the subject matter of Example 8 optionally includes: wherein the position circuit is to determine that the first position of the body part is offset from an end of the trajectory in a direction of the second haptic actuator; and wherein the feedback circuit is to excite the second haptic actuator at a third level that is different than the first level.

Example 10 is a method for manipulating a virtual projectile, comprising: receiving trajectory data describing a trajectory of a virtual projectile; receiving from a motion sensor a motion signal describing a motion of a haptic device; determining a first position of a body part of a user of the haptic device based at least in part on the motion signal; determining a first distance between the first position of the body part and the trajectory; exciting a haptic actuator at a first level, wherein the haptic actuator is positioned to generate a sensation to a user of the haptic device; after determining the first position of the body part, determining a second position of the body part; determining a second distance between the second position of the body part and the trajectory, wherein the second distance is different than the first distance; and exciting the haptic actuator at a second level different than the first level.

In Example 11, the subject matter of Example 10 optionally includes after determining the second position of the body part, determining a third position of the body part; determining that a third distance between the second position of the body and the trajectory is less than a threshold distance; and exciting the haptic actuator at a third level different than the first level and the second level.

In Example 12, the subject matter of any one or more of Examples 10-11 optionally include wherein the haptic actuator comprises a rotating motor and an eccentric rotating mass, wherein exciting the haptic actuator at the first level comprises rotating the motor at a first rotational speed, and wherein exciting the haptic actuator at the second level comprises rotating the motor at a second rotational speed different than the first rotational speed.

In Example 13, the subject matter of any one or more of Examples 10-12 optionally include wherein exciting the haptic actuator at the first level comprises exciting the haptic actuator at a first amplitude, and wherein exciting the haptic actuator at the second level comprises exciting the haptic actuator at a second amplitude different than the first amplitude.

In Example 14, the subject matter of any one or more of Examples 10-13 optionally include determining that virtual projectile is at an end of the trajectory; determining a third position of the body part when the virtual projectile is at the end of the trajectory; determining that the third position of the body part is within a threshold distance of the trajectory when the virtual projectile is at the end of the trajectory; and exciting the haptic actuator at a third level indicating that the virtual projectile was received.

In Example 15, the subject matter of any one or more of Examples 10-14 optionally include determining that virtual projectile is at an end of the trajectory; determining a third position of the body part when the virtual projectile is at the end of the trajectory; determining that the third position of the body part is not within a threshold distance of the end of the trajectory when the virtual projectile is at the end of the trajectory; and exciting the haptic actuator at a third level indicating that the virtual projectile was not received.

In Example 16, the subject matter of any one or more of Examples 10-15 optionally include receiving projectile data describing a second virtual projectile; generating a second motion signal describing a second motion of the haptic device; determining that the second motion of the haptic device is a propelling motion; exciting the haptic actuator at a third level indicating propelling of the second virtual projectile; determining trajectory data for the second virtual projectile based at least in part on the second motion signal; and sending the trajectory data to at least a second haptic device.

In Example 17, the subject matter of any one or more of Examples 10-16 optionally include wherein the haptic device further comprises: a body configured to be positioned around a wrist of the user, wherein the haptic actuator is coupled to the body at a first position; and a second haptic actuator coupled to the body at a second position.

In Example 18, the subject matter of Example 17 optionally includes determining that the first position of the body part is offset from an end of the trajectory in a direction of the second haptic actuator; and exciting the second haptic actuator at a third level that is different than the first level.

Example 19 is at least one computer readable medium comprising instructions to perform any of the methods of Examples 10-18.

Example 20 is an apparatus comprising means for performing any of the methods of Examples 10-18.

Example 21 is an apparatus for manipulating a virtual projectile, comprising: means for receiving trajectory data describing a trajectory of a virtual projectile; means for receiving from a motion sensor a motion signal describing a motion of a haptic device; means for determining a first position of a body part of a user of the haptic device based at least in part on the motion signal; means for determining a first distance between the first position of the body part and the trajectory; means for exciting a haptic actuator at a first level, wherein the haptic actuator is positioned to generate a sensation to a user of the haptic device; means for after determining the first position of the body part, determining a second position of the body part; means for determining a second distance between the second position of the body part and the trajectory, wherein the second distance is different than the first distance; and means for exciting the haptic actuator at a second level different than the first level.

In Example 22, the subject matter of Example 21 optionally includes means for, after determining the second position of the body part, determining a third position of the body part; means for determining that a third distance between the second position of the body and the trajectory is less than a threshold distance; and means for exciting the haptic actuator at a third level different than the first level and the second level.

In Example 23, the subject matter of any one or more of Examples 21-22 optionally include wherein the haptic actuator comprises a rotating motor and an eccentric rotating mass, wherein exciting the haptic actuator at the first level comprises rotating the motor at a first rotational speed, and wherein exciting the haptic actuator at the second level comprises rotating the motor at a second rotational speed different than the first rotational speed.

In Example 24, the subject matter of any one or more of Examples 21-23 optionally include wherein exciting the haptic actuator at the first level comprises exciting the haptic actuator at a first amplitude, and wherein exciting the haptic actuator at the second level comprises exciting the haptic actuator at a second amplitude different than the first amplitude.

In Example 25, the subject matter of any one or more of Examples 21-24 optionally include means for determining that virtual projectile is at an end of the trajectory; means for determining a third position of the body part when the virtual projectile is at the end of the trajectory; means for determining that the third position of the body part is within a threshold distance of the trajectory when the virtual projectile is at the end of the trajectory; and means for exciting the haptic actuator at a third level indicating that the virtual projectile was received.

In Example 26, the subject matter of any one or more of Examples 21-25 optionally include means for determining that virtual projectile is at an end of the trajectory; means for determining a third position of the body part when the virtual projectile is at the end of the trajectory; means for determining that the third position of the body part is not within a threshold distance of the end of the trajectory when the virtual projectile is at the end of the trajectory; and means for exciting the haptic actuator at a third level indicating that the virtual projectile was not received.

In Example 27, the subject matter of any one or more of Examples 21-26 optionally include means for receiving projectile data describing a second virtual projectile; means for generating a second motion signal describing a second motion of the haptic device; means for determining that the second motion of the haptic device is a propelling motion; means for exciting the haptic actuator at a third level indicating propelling of the second virtual projectile; means for determining trajectory data for the second virtual projectile based at least in part on the second motion signal; and means for sending the trajectory data to at least a second haptic device.

In Example 28, the subject matter of any one or more of Examples 21-27 optionally include wherein the haptic device further comprises: a body configured to be positioned around a wrist of the user, wherein the haptic actuator is coupled to the body at a first position; and a second haptic actuator coupled to the body at a second position.

In Example 29, the subject matter of Example 28 optionally includes means for determining that the first position of the body part is offset from an end of the trajectory in a direction of the second haptic actuator; and means for exciting the second haptic actuator at a third level that is different than the first level.

Example 30 is a haptic device for manipulating a virtual projectile, comprising: a motion sensor to generate a motion signal describing a motion of the haptic device; a haptic actuator to generate a sensation to a user of the haptic device; an input/output (I/O) circuit to receive projectile data describing the virtual projectile; a position circuit to determine that the motion of the haptic device is a propelling motion; a feedback circuit to excite the haptic actuator at a first level indicating propelling of the virtual projectile; wherein the position circuit is to determine trajectory data describing a trajectory of the virtual projectile based at least in part on the motion signal; and wherein the I/O circuit is to send the trajectory data to at least a second haptic device.

In Example 31, the subject matter of Example 30 optionally includes wherein the projectile data describes a type of the virtual projectile.\

In Example 32, the subject matter of any one or more of Examples 30-31 optionally include wherein the projectile data describes a geographic destination for the virtual projectile.

In Example 33, the subject matter of any one or more of Examples 30-32 optionally include wherein determining the trajectory for the virtual projectile is based at least in part on the projectile data.

In Example 34, the subject matter of any one or more of Examples 30-33 optionally include wherein the projectile data comprises virtual physics data describing a virtual law of physics different than a natural law of physics, and wherein the trajectory of the virtual projectile is based at least in part on the virtual law of physics.

In Example 35, the subject matter of any one or more of Examples 30-34 optionally include wherein the feedback circuit is to cease exciting the haptic actuator at an end of the propelling motion.

In Example 36, the subject matter of any one or more of Examples 30-35 optionally include a comparator circuit: wherein the I/O circuit is to receive second trajectory data describing a second trajectory; wherein the motion sensor is to generate a second motion signal describing a second motion of the haptic device; wherein the position circuit is to determine a first position of a body part of a user of the haptic device based at least in part on the second motion signal; wherein the comparator circuit is to determine a first distance between the first position of the body part and the second trajectory; wherein the feedback circuit is to excite the haptic actuator at a second level; wherein the position circuit is to, after determining the first position of the body part, determine a second position of the body part; wherein the comparator circuit is to determine a second distance between the second position of the body part and the trajectory, wherein the second distance is different than the first distance; and wherein the feedback circuit is to excite the haptic actuator at a third level different than the second level.

In Example 37, the subject matter of any one or more of Examples 30-36 optionally include wherein the position circuit is to select the virtual projectile based at least in part on the motion of the haptic device.

Example 38 is a method for throwing a virtual projectile, comprising: receiving projectile data describing the virtual projectile; receiving, from a motion sensor, a motion signal describing a motion of a haptic device; determining that the motion of the haptic device is a propelling motion; exciting a haptic actuator of the haptic device at a first level indicating propelling of the virtual projectile, wherein the haptic actuator is positioned to generate a sensation to a user of the haptic device; determining trajectory data for the virtual projectile based at least in part on the motion signal; and sending the trajectory data to at least a second haptic device.

In Example 39, the subject matter of Example 38 optionally includes wherein the projectile data describes a type of the virtual projectile.

In Example 40, the subject matter of any one or more of Examples 38-39 optionally include wherein the projectile data describes a geographic destination for the virtual projectile.

In Example 41, the subject matter of any one or more of Examples 38-40 optionally include wherein determining the trajectory for the virtual projectile is based at least in part on the projectile data.

In Example 42, the subject matter of any one or more of Examples 38-41 optionally include wherein the projectile data comprises virtual physics data describing a virtual law of physics different than a natural law of physics, and wherein the trajectory of the virtual projectile is based at least in part on the virtual law of physics.

In Example 43, the subject matter of any one or more of Examples 38-42 optionally include determining an end of the propelling motion; and ceasing to excite the haptic actuator.

In Example 44, the subject matter of any one or more of Examples 38-43 optionally include receiving second trajectory data describing a second trajectory of the virtual projectile; generating a second motion signal describing a second motion of the haptic device; determining a first position of a body part of the user based at least in part on the second motion signal; determining a first distance between the first position of the body part and the second trajectory; exciting the haptic actuator at a second level; after determining the first position of the body part, determining a second position of the body part; determining a second distance between the second position of the body part and the trajectory, wherein the second distance is different than the first distance; and exciting the haptic actuator at a third level different than the second level.

Example 45 is at least one computer readable medium comprising instructions to perform any of the methods of Examples 38-44.

Example 46 is an apparatus comprising means for performing any of the methods of Examples 38-44.

Example 47 is an apparatus for manipulating a virtual projectile, comprising: means for receiving projectile data describing the virtual projectile; means for receiving, from a motion sensor, a motion signal describing a motion of a haptic device; means for determining that the motion of the haptic device is a propelling motion; means for exciting a haptic actuator of the haptic device at a first level indicating propelling of the virtual projectile, wherein the haptic actuator is positioned to generate a sensation to a user of the haptic device; means for determining trajectory data for the virtual projectile based at least in part on the motion signal; and means for sending the trajectory data to at least a second haptic device.

In Example 48, the subject matter of Example 47 optionally includes wherein the projectile data describes a type of the virtual projectile.

In Example 49, the subject matter of any one or more of Examples 47-48 optionally include wherein the projectile data describes a geographic destination for the virtual projectile.

In Example 50, the subject matter of any one or more of Examples 47-49 optionally include wherein determining the trajectory for the virtual projectile is based at least in part on the projectile data.

In Example 51, the subject matter of any one or more of Examples 47-50 optionally include wherein the projectile data comprises virtual physics data describing a virtual law of physics different than a natural law of physics, and wherein the trajectory of the virtual projectile is based at least in part on the virtual law of physics.

In Example 52, the subject matter of any one or more of Examples 47-51 optionally include means for determining an end of the propelling motion; and means for ceasing to excite the haptic actuator.

In Example 53, the subject matter of any one or more of Examples 47-52 optionally include means for receiving second trajectory data describing a second trajectory of the virtual projectile; means for generating a second motion signal describing a second motion of the haptic device; means for determining a first position of a body part of the user based at least in part on the second motion signal; means for determining a first distance between the first position of the body part and the second trajectory; means for exciting the haptic actuator at a second level; means for, after determining the first position of the body part, determining a second position of the body part; means for determining a second distance between the second position of the body part and the trajectory, wherein the second distance is different than the first distance; and means for exciting the haptic actuator at a third level different than the second level.

The above detailed description includes references to the accompanying drawings, which form a part of the detailed description. The drawings show, by way of illustration, specific examples that may be practiced. These examples are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other examples may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as examples may feature a subset of said features. Further, examples may include fewer features than those disclosed in a particular example. Thus, the following claims are hereby incorporated into the Detailed Description, with a claim standing on its own as a separate example. The scope of the examples disclosed herein is to be determined with reference to the appended claims, along with the full scope of equivalents to which such claims are entitled.

What is claimed is:

1. A haptic device for manipulating a virtual projectile, comprising:

an input/output (I/O) circuit to receive trajectory data describing a trajectory of the virtual projectile;
a position circuit to determine a first position of a body part of a user based at least in part on a motion signal received from a motion sensor;
a comparator circuit to determine a first distance between the first position of the body part and the trajectory;
a feedback circuit to excite a haptic actuator of the haptic device at a first level;
wherein the position circuit is to, after determining the first position of the body part, determine a second position of the body part;
wherein the comparator circuit is to determine a second distance between the second position of the body part and the trajectory, wherein the second distance is different than the first distance;
wherein the feedback circuit is to excite the haptic actuator at a second level different than the first level;
wherein the comparator circuit is to determine that the body part is positioned within a first threshold distance of the trajectory when the virtual projectile is at an end of the trajectory; and
wherein the feedback circuit is to excite the haptic actuator at a third level indicating that the virtual projectile was received by the user.

2. The haptic device of claim 1:
wherein the position circuit is to, after determining the second position of the body part, determine a fourth position of the body part;
wherein the comparator circuit is to determine that a third distance between the second fourth position of the body and the trajectory is less than a second threshold distance; and
wherein the feedback circuit is to excite the haptic actuator at a fourth level different than the first level and the second level.

3. The haptic device of claim 1, wherein the haptic actuator comprises a rotating motor and an eccentric rotating mass, wherein exciting the haptic actuator at the first level comprises rotating the motor at a first rotational speed, and wherein exciting the haptic actuator at the second level comprises rotating the motor at a second rotational speed different than the first rotational speed.

4. The haptic device of claim 1, wherein exciting the haptic actuator at the first level comprises exciting the haptic actuator at a first amplitude, and wherein exciting the haptic actuator at the second level comprises exciting the haptic actuator at a second amplitude different than the first amplitude.

5. The haptic device of claim 1, wherein the comparator circuit is to determine that a position of the body part when a second virtual projectile is at an end of a second trajectory is not within a third threshold distance of the end of the second trajectory when the virtual projectile is at the end of the second trajectory, and wherein the feedback circuit is to excite the haptic actuator at a third level indicating that the virtual projectile was not received.

6. The haptic device of claim 1:
wherein the I/O circuit is to receive projectile data describing a second virtual projectile;
wherein the motion sensor is to generate a second motion signal describing a second motion of the haptic device;
wherein the position circuit is to determine that the second motion of the haptic device is a propelling motion;
wherein the feedback circuit is to excite the haptic actuator at a third level indicating propelling of the second virtual projectile;
wherein the position circuit is to determine trajectory data for the second virtual projectile based at least in part on the second motion signal; and
wherein the I/O circuit is to send the trajectory data to at least a second haptic device.

7. The haptic device of claim 1, wherein the haptic device further comprises:
a body configured to be positioned around a wrist of the user, wherein the haptic actuator is coupled to the body at a first position; and
a second haptic actuator coupled to the body at a second position.

8. The haptic device of claim 7:
wherein the position circuit is to determine that the first position of the body part is offset from an end of the trajectory in a direction of the second haptic actuator; and
wherein the feedback circuit is to excite the second haptic actuator at a third level that is different than the first level.

9. A method for manipulating a virtual projectile, comprising:
receiving trajectory data describing a trajectory of a virtual projectile;
receiving from a motion sensor a motion signal describing a motion of a haptic device;
determining a first position of a body part of a user of the haptic device based at least in part on the motion signal;
determining a first distance between the first position of the body part and the trajectory;
exciting a haptic actuator at a first level, wherein the haptic actuator is positioned to generate a sensation to a user of the haptic device;
after determining the first position of the body part, determining a second position of the body part;
determining a second distance between the second position of the body part and the trajectory, wherein the second distance is different than the first distance;
exciting the haptic actuator at a second level different than the first level
determining that the body part is positioned within a first threshold distance of the trajectory when the virtual projectile is at an end of the trajectory; and
exciting the haptic actuator at a third level indicating that the virtual projectile was received by the user.

10. The method of claim 9, further comprising:
after determining the second position of the body part, determining a fourth position of the body part;
determining that a third distance between the fourth position of the body and the trajectory is less than a second threshold distance; and
exciting the haptic actuator at a third level different than the first level and the second level.

11. The method of claim 9, further comprising:
receiving projectile data describing a second virtual projectile;
generating a second motion signal describing a second motion of the haptic device;
determining that the second motion of the haptic device is a propelling motion;
exciting the haptic actuator at a third level indicating propelling of the second virtual projectile;
determining trajectory data for the second virtual projectile based at least rn part on the second motion signal; and
sending the trajectory data to at least a second haptic device.

12. The method of claim 9, wherein the haptic device further comprises:
a body configured to be positioned around a wrist of the user, wherein the haptic actuator is coupled to the body at a first position; and
a second haptic actuator coupled to the body at a second position.

13. The method of claim 12, further comprising:
determining that the first position of the body part is offset from an end of the trajectory in a direction of the second haptic actuator; and
exciting the second haptic actuator at a third level that is different than the first level.

14. At least one non-transitory computer readable medium comprising instructions thereon that, when executed by at least one processor, cause the at least one processor to perform:
receiving trajectory data describing a trajectory of a virtual projectile;
receiving from a motion sensor a motion signal describing a motion of a haptic device;
determining a first position of a body part of a user of the haptic device based at least in part on the motion signal;
determining a first distance between the first position of the body part and the trajectory;
exciting a haptic actuator at a first level, wherein the haptic actuator is positioned to generate a sensation to a user of the haptic device;
after determining the first position of the body part, determining a second position of the body part;
determining a second distance between the second position of the body part and the trajectory, wherein the second distance is different than the first distance;
exciting the haptic actuator at a second level different than the first level
determining that the body part is positioned within a first threshold distance of the trajectory when the virtual projectile is at the end of the trajectory; and
exciting the haptic actuator at a third level indicating that the virtual projectile was received by the user.

15. The at least one computer readable medium of claim 14, further comprising instructions thereon that, when executed by at least one processor, cause the at least one processor to perform:
after determining the second position of the body part, determining a fourth position of the body part;
determining that a third distance between the fourth, position of the body and the trajectory is less than a second threshold distance; and
exciting the haptic actuator at a third level different than the first level and the second level.

16. The at least one computer readable medium of claim 14, wherein the haptic actuator comprises a rotating motor and an eccentric rotating mass, wherein exciting the haptic actuator at the first level comprises rotating the motor at a first rotational speed, and wherein exciting the haptic actuator at the second level comprises rotating the motor at a second rotational speed different than the first rotational speed.

17. The at least one computer readable medium of claim 14, wherein exciting the haptic actuator at the first level comprises exciting the haptic actuator at a first amplitude, and wherein exciting the haptic actuator at the second level comprises exciting the haptic actuator at a second amplitude different than the first amplitude.

18. A haptic device for manipulating a virtual projectile, comprising:
a motion sensor to generate a motion signal describing a motion of the haptic device;
a haptic actuator to generate a sensation to a user of the haptic device;
an input/output (I/O) circuit to receive projectile data describing the virtual projectile;
a position circuit to determine that the motion of the haptic device is a propelling motion;
a feedback circuit to excite the haptic actuator at a first level indicating propelling of the virtual projectile;
wherein the position circuit is to determine trajectory data describing a trajectory of the virtual projectile based at least in part on the motion signal;
wherein the I/O circuit is to send the trajectory data to at least a second haptic device;
a comparator circuit is to determine that a body part of the user is positioned within a first threshold distance of a second trajectory of the virtual projectile towards the user when the virtual projectile is at an end of the second trajectory; and
wherein the feedback circuit is to excite the haptic actuator at a second level indicating that the virtual projectile was received by the user.

19. The haptic device of claim 18, wherein the projectile data describes a type of the virtual projectile.

20. The haptic device of claim 18, wherein the projectile data describes a geographic destination for the virtual projectile.

21. The haptic device of claim 18, wherein determining the trajectory for the virtual projectile is based at least in part on the projectile data.

22. The haptic device of claim 18, wherein the projectile data comprises virtual physics data describing a virtual law of physics different than a natural law of physics, and wherein the trajectory of the virtual projectile is based at least in part on the virtual law of physics.

23. The haptic device of claim 18, wherein the position circuit is to select the virtual projectile based at least in part on the motion of the haptic device.

* * * * *

UNITED STATES PATENT AND TRADEMARK OFFICE
CERTIFICATE OF CORRECTION

PATENT NO. : 10,709,975 B2
APPLICATION NO. : 15/197461
DATED : July 14, 2020
INVENTOR(S) : Robert Lawson Vaughn Page 1 of 1

It is certified that error appears in the above-identified patent and that said Letters Patent is hereby corrected as shown below:

In the Claims

Column 24, Line 64, Claim 11, delete "rn" and insert --in-- therefor

Column 25, Line 47, Claim 15, delete "fourth," and insert --fourth-- therefor

Signed and Sealed this
Twenty-eighth Day of December, 2021

Drew Hirshfeld
*Performing the Functions and Duties of the
Under Secretary of Commerce for Intellectual Property and
Director of the United States Patent and Trademark Office*